United States Patent [19]

Davis et al.

[11] Patent Number: 4,839,203
[45] Date of Patent: Jun. 13, 1989

[54] SEMI-PERMEABLE MEMBRANES PREPARED VIA REACTION OF CATIONIC GROUPS WITH NUCLEOPHILIC GROUPS

[75] Inventors: Thomas E. Davis, Lafayette, Calif.; Donald L. Schmidt, Midland, Mich.; Jee I. Kau, Concord, Calif.; Ritchie A. Wessling, Midland, Mich.; Sharon S. Whipple, Sanford, Mich.; Richard F. Fibiger, Midland, Mich.; Dale M. Pickelman, Auburn, Mich.

[73] Assignee: The Dow Chemical Company, Midland, Mich.

[21] Appl. No.: 86,122

[22] Filed: Aug. 17, 1987

Related U.S. Application Data

[60] Division of Ser. No. 790,287, Oct. 22, 1985, Pat. No. 4,704,324, which is a continuation-in-part of Ser. No. 719,037, Apr. 3, 1985, abandoned, which is a continuation of Ser. No. 313,051, Oct. 19, 1981, abandoned, which is a continuation-in-part of Ser. No. 162,356, Jun. 24, 1980, abandoned.

[51] Int. Cl.$^4$ ............................................. B32B 27/00
[52] U.S. Cl. ............................ 427/244; 210/500.27; 210/500.41; 427/393.5; 427/399; 427/412.1
[58] Field of Search ............... 427/244, 412.1, 393.5, 427/399

[56] References Cited

U.S. PATENT DOCUMENTS

| | | |
|---|---|---|
| 2,676,166 | 4/1954 | Webers . |
| 2,891,025 | 6/1959 | Price . |
| 3,078,259 | 2/1963 | Hatch et al. . |
| 3,269,991 | 8/1966 | La Combe ........................ 526/287 |
| 3,276,598 | 10/1966 | Michaels et al. . |
| 3,335,100 | 8/1967 | Geyer . |
| 3,419,430 | 12/1968 | Michaels . |
| 3,419,431 | 12/1968 | Michaels . |
| 3,429,839 | 2/1969 | Franco . |
| 3,467,604 | 9/1969 | Michaels . |
| 3,544,499 | 12/1970 | Hatch . |
| 3,546,142 | 12/1970 | Michaels et al. . |
| 3,578,458 | 5/1971 | Taylor . |
| 3,637,432 | 1/1972 | Gibbs et al. . |
| 3,737,045 | 6/1973 | Hashimoto et al. ................ 264/49 |
| 3,804,797 | 4/1974 | Broxterman et al. . |
| 3,962,165 | 6/1976 | Bosso et al. . |
| 3,963,662 | 6/1976 | Fujiwara et al. . |
| 3,965,032 | 6/1976 | Gibbs et al. ........................ 526/319 |
| 3,998,776 | 12/1976 | Wagener et al. . |
| 4,017,372 | 4/1977 | Wagener et al. . |
| 4,096,154 | 6/1978 | Rempfler et al. . |
| 4,214,096 | 7/1980 | Klingler et al. .................... 560/147 |
| 4,225,407 | 9/1980 | Wagener et al. . |
| 4,337,185 | 6/1982 | Wessling et al. .................... 524/458 |
| 4,360,434 | 11/1982 | Kawaguchi et al. ............. 210/500.2 |
| 4,383,073 | 5/1983 | Wessling et al. .................... 524/416 |
| 4,426,489 | 1/1984 | Wessling et al. .................... 524/815 |
| 4,431,768 | 2/1984 | Wessling et al. .................... 524/543 |
| 4,432,875 | 2/1984 | Wrasidlo et al. ................. 210/500.2 |
| 4,444,977 | 4/1984 | Aikawa et al. ...................... 528/109 |

FOREIGN PATENT DOCUMENTS 0124676 11/1984 European Pat. Off. .

OTHER PUBLICATIONS

K. C. Frisch et al., *Polyelectrolytes*, pp. 34-42, Technomic Publishing, (1976).
D. R. Crist et al., *Angew Chem. Int. Ed.*, vol. 8, No. 12, pp. 962-974, (1969).
D. L. Schmidt et al., *J. of Paint Tech.*, vol. 46, No. 588, pp. 41-46, (1974).
G. D. Jones, *Polyelectrolytes*, pp. 144-176, Technomic Publ., (1976).
J. V. Crivello, *Adv. Poly. Sci.*, 62, pp. 29-30, (1984).
T. Saegusa et al., *Poly. Bull.*, 1, pp. 171-176, (1978).
I. Murase et al., *Poly. Comm.*, 25, pp. 327-329, (1984).
D. R. Gagnon et al., *Poly. Bull.*, 12, pp. 293-298, (1984).
M. Hatch, *Prog. Org. Coatings*, 1, pp. 61-78, (1976).

Primary Examiner—Christopher Henderson
Attorney, Agent, or Firm—Michael L. Glenn; Thomas A. Lodd

[57] ABSTRACT

A novel composite membrane and methods of making the membrane are described. The discriminating layer of the membrane is prepared by reaction of a reactive cationic compound group with a compound bearing a nucleophilic moiety. At least one of the reactants bears an average of two or more reactive groups. The reaction product contains covalent bonds formed via charge eliminating reactions.

In a preferred embodiment of the invention, the nucleophilic group is anionic and a coacervate is formed initially on a microporous substrate. The resulting membrane may be useful for reverse osmosis, gas or ultrafiltration separations.

44 Claims, No Drawings

SEMI-PERMEABLE MEMBRANES PREPARED VIA REACTION OF CATIONIC GROUPS WITH NUCLEOPHILIC GROUPS

CROSS-REFERENCE TO RELATED APPLICATION

This is a divisional of application Ser. No. 790,287, filed Oct. 22, 1985, now U.S. Pat. No. 4,704,324, which is a continuation-in-part of application Ser. No. 719,037, filed Apr. 3, 1985, now abandoned, which is a continuation of application Ser. No. 313,051, filed Oct. 19, 1981, now abandoned, which is a continuation-in-part of application Ser. No. 162,356, filed June 24, 1980, now abandoned.

BACKGROUND OF THE INVENTION

Semi-permeable membranes prepared from various synthetic polymeric compositions are being used in an increasing number of commercial and industrial applications. Such uses include such diverse fields as the demineralization of saline water, gas separation, separation of organic materials, and ultrafiltration. Depending on the synthetic polymer used and the intended application, the membranes may be prepared by several methods well known to those skilled in the art. Generally such preparations include the steps of dissolving or dispersing a monomer or a prepolymer into a casting solvent, casting a film from the prepolymer, evaporating at least part of the casting solvent from the cast film, and curing the membrane. See U.S. Pat. No. 3,133,132.

The casting solvents currently in use are mostly organic solvents such as acetone, methyl ethyl ketone, ethyl alcohol, methyl alcohol, methylene chloride, and chloroform. Such solvents are frequently costly, highly flammable or suffer from other drawbacks. Certain casting solvents present health hazards when inhaled as vapors or upon contact with the skin. The discharge of the vapors into the air also may be subject to governmental regulation necessitating some kind of recovery or disposal system. Therefore, it would be desirable to be able to cast a membrane from an aqueous mixture or solution.

Additionally, it is important that the membrane discriminating layer be as thin as possible, while being defect free. Techniques for forming thin, uniform discriminating layers have long been sought.

SUMMARY OF THE INVENTION

The present invention is directed to a supported, semi-permeable polymeric membrane. The supported membrane comprises at least one permselective discriminating layer affixed to a supporting surface in a manner such that when the membrane is sealingly engaged to a vessel which defines a first space communicating with a first surface of the membrane, components to which the membrane is permeable in a fluid mixture contacting the first surface of the membrane can permeate through the membrane to a second space. Generally, the second space will not communicate with the first except by permeation through the membrane. The semi-permeable membrane has at least one discriminating layer which comprises a reaction product of a first compound bearing at least one reactive cationic moiety with a second compound including at least one nucleophilic moiety reactive with said cation group, with the proviso that at least one of the first and second compounds bears a plurality of reactive cationic or reactive nucleophilic groups or either the first or second compound is polymerizable, said reaction product containing a plurality of non-ionic bonds created with extinction of the cationic charge present in the reacting cationic group. Preferably, the reactive cationic compound is water-compatible. The first and second compounds can be the same or different and can be monomers, polymers or hydrophobes.

As used herein, the term "water-compatible" refers to any compound which will form a stable or metastable mixture with water, including a solution, colloidal suspension, stable emulsion or dispersion, a latex and the like. "Reactive cationic moieties" and "reactive nucleophilic moieties" refer to moieties which will react with each other at conditions not deleterious to the membrane characteristics of the resulting product. The reaction of the cationic moiety with the nucleophile is one which results in the formation of covalent bonds with extinction or elimination of the cationic charge.

The present invention also is directed to a method of forming a semi-permeable membrane. In this method, a permeable substrate bearing through physical contact or chemical bonding a plurality of reactive ionic groups of a first charge is contacted with a compound bearing at least one reactive group of a charge opposite the first charge to form an ionically-bonded, coacervate layer. The coated substrate is then subjected to conditions effective to promote reaction of a plurality of the groups ionically bonded in the coacervate layer to form covalent (i.e., essentially non-ionic) bonds. The resulting layer containing covalent bonds is essentially water insoluble (less than 0.1 percent by weight in water at 25° C.).

The invention can also be used to improve the selectivity of a semi-permeable membrane. This method comprises contacting at least one surface of the semi-permeable membrane with a first reactive aqueous ionic compound while maintaining a chemical potential gradient so as to transport water across the membrane and deposit the ionic compound on the surface of the membrane. The surface of the membrane bearing the deposited ionic compound is then contacted with a second reactive, aqueous ionic compound of opposite charge to the deposited ionic compound, so as to form an ionically-bonded, coacervate layer. The membrane is then subjected to reactive conditions so as to convert a plurality of the ionic bonds in the coacervate layer to covalent or essentially non-ionic bonds. Preferably, sufficient covalent bonds are formed to render the discriminating layer essentially water-insoluble.

The instant invention avoids many of the disadvantages of membranes prepared using prior art methods. Not only may the use of organic solvents be largely avoided and the entire casting procedure simplified, but certain membranes prepared using this process have demonstrated outstanding stability. This latter characteristic is highly desirable in applications where the semi-permeable membrane may be exposed to fluid mixtures containing chlorine or other oxidizers such as are frequently found in aqueous waste streams. Membranes within the scope of this invention have also demonstrated good thermal stability. Further, semi-permeable membranes within the scope of this invention have shown excellent hydrolytic (pH) stability, compaction resistance (pressure stability) and excellent selectivity and permeability in gas separations.

Membranes within the scope of this invention include membranes used for filtration, which discriminate on the basis of size. Microfiltration and ultrafiltration membranes can be made by the practice of this invention. Particularly preferred embodiments of this invention are permselective and can be used for separation of gas components in gaseous mixtures or liquid components in fluids. Reverse osmosis, dialysis, pervaporation, gas dehydration and enrichment are all possible applications for the membranes of the subject invention. Additionally, certain of these membranes are useful in electrochemical processes or medical devices. Preferably, the discriminating layer of membranes herein described lacks sufficient ionic character to be ion selective and is not bibulous, i.e., absorbs less than about 20 weight percent water, more preferably less than about 15 weight percent water at 25° C. and 100 percent relative humidity.

DETAILED DESCRIPTION OF THE INVENTION

Reactive Compounds

The polymeric composition which constitutes the discriminating layer in the membranes of this invention results from the chemical reaction of one or more membrane precursor compounds. Typically, the discriminating layer is a water-insoluble, relatively thin, substantially continuous layer on a permeable supporting layer.

The membrane precursor compound or compounds are monovalent or multivalent organic radicals bearing at least one reactive moiety. This reactive moiety is either a reactive organic cation or a nucleophile, with the proviso that the cation react with the nucleophile to form nonionic bonds in the reaction product. Depending on the nature of the reactive moieties, the membrane precursor compound or compounds can be cationic, anionic, zwitterionic, amphoteric or nonionic.

Cationic membrane precursor compounds contain reactive organic cations with the proviso that cationic moieties inert in the membrane formation reaction can also be present. Anionic membrane precursors containing anionic nucleophilic moieties can optionally bear additional anionic groups which are inert in the membrane formation reaction. Zwitterionic membrane precursor compounds bear both reactive anionic and reactive cationic moieties in equal numbers or with an excess of cationic groups. Nonionic membrane precursor compounds bear nucleophilic groups that do not bear a charge at the pH of the membrane forming process.

The membrane precursor compounds are selected from: (1) compounds bearing hydrophobes, (2) polymerizable compounds and (3) polymers substituted with an average of more than one reactive group. Preferably, polymeric membrane precursors bear an average of at least two reactive groups.

Hydrophobes are hydrocarbyl (i.e., a monovalent hydrocarbon radical), substituted hydrocarbyl or monovalent dialkyl siloxane groups which have low affinity for water. Operable hydrophobic groups are well known in the literature pertaining to surfactants. Illustrative hydrophobes include $C_8$ to $C_{20}$ monovalent hydrocarbon radicals, $C_4$ to $C_{20}$ perfluorinated monovalent hydrocarbon radicals or dimethyl siloxane moieties. The hydrophobe is preferably bonded to one or more reactive groups such that the membrane precursor compound forms micelles or vesicles in water.

Polymerizable reactive cationic compounds bear one or more groups capable of reacting to form high molecular weight or crosslinked polymers in the formation of the membrane. Illustrative of such compounds are: (1) compounds with an average of at least two reactive groups which may consist of two cationic moieties, two nucleophilic moieties or one cationic moiety together with one nucleophilic moiety; (2) compounds containing at least one reactive cationic or nucleophilic group and at least one polymerizable group such as an ethylenically-unsaturated group, a vicinal epoxide, a silanol, or the like; and (3) compounds containing reactive cationic groups which are converted into polymerizable groups during reaction of the cationic or nucleophilic group. M. J. Hatch, *Progress in Organic Coatings*, 1, pp. 61–78, Elsevier Sequoia S.A. (1976), describes a variety of such reactants and is incorporated herein by reference.

Polymeric compounds include both addition and condensation polymers containing an average of more than one reactive group. The reactive moiety may be part of the polymer chain, pendant from but bonded to the chain, bonded to the ends of the chain or part of a pendant moiety bonded to the chain. The polymer can be a water-soluble polyelectrolyte or ionomer, a water-dispersible polyelectrolyte, a latex with a bound charge (see U.S. Pat. No. 4,056,501) or a water-insoluble polymer which is suitable as a support for the membrane discriminating layer.

The reactive nucleophile or cationic compound can also be a silanol. Illustrative reactants can be represented by the formula $$CH_3O-\underset{\underset{OCH_3}{|}}{\overset{\overset{OCH_3}{|}}{Si}}-(CH_2)_{\overline{x}}X-(CH_2)_xY$$

wherein X is a chemical bond, —O—, —S—, —NH—,

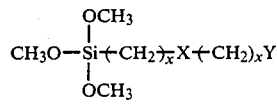

or a reactive cationic group or nucleophile, Y is (1) a hydrocarbyl optionally substituted with a reactive nucleophilic or cationic group, (2) a reactive cationic group or (3) reactive nucleophilic group and x at each occurrence is independently an integer from 1 to 20.

The molecular weight, charge density, hydrophilicity and other properties of the reactive polymers can be varied by known techniques. The optimum reactants for specific substrates, membrane formation processes and separations can then be determined empirically.

Multi-component polymers usually consist of different monomeric units each of which contributes a desired characteristic to the resulting polymer and ultimately to the finished membrane. For example, monomers may be used which contribute nucleophilic groups for reacting with or cross-linking through the cationic group, enhance the hydrophobic or hydrophilic properties of the membrane, exert a special affinity for the species which is to be separated using the finished membrane, improve film-forming properties or adjust the mechanical properties of the resulting membrane.

In order to impart the desired properties to the membrane discriminating layer, it is preferred that polymeric reactants can contain other groups in the repeating unit in addition to the moiety directly bearing or including the reactive cationic or nucleophilic group, provided these groups do not adversely affect the membrane or its formation. For example, in cationic vinyl addition polymers, such methacrylate derivatives as

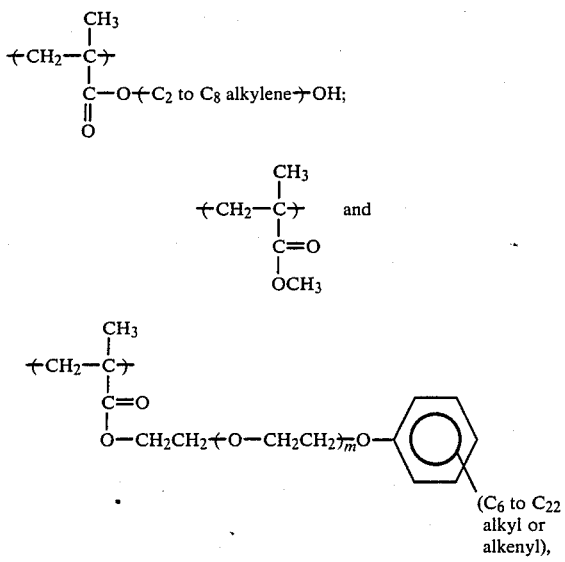

wherein m is an integer from 1 to 20, may be present to advantage in membranes for reverse osmosis. For gas separation membranes and other applications where hydrolytic stability is not critical, in addition to the aforementioned methacrylate derivatives, the corresponding acrylate moieties are also operable. In addition, gas separation membranes can be derived from moieties such as

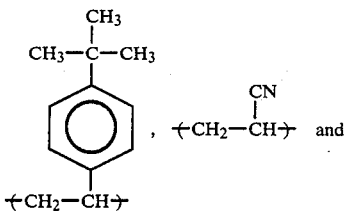

repeating units based on dicyclopentenyl acrylate, isobornyl acrylate, isobornyl methacrylate or dicyclopentenyl methacrylate. Isobornyl acrylate and methacrylate and dicyclopentenyl acrylate are available commercially from Alcolac, Inc.

Reactive Cationic Compounds

The reactive cationic compounds used herein are selected from compounds and polymers generally well-known in the art. These compounds or polymers preferably bear as the cationic moieties at least one moiety containing a heteroatom bearing a positive charge selected from nitrogen, phosphorus, oxygen, sulfur or iodine. Other operable cations can be selected from Groups VA and VIA of the periodic table, but are generally not preferred. These cationic groups are also referred to collectively as "onium groups".

These reactive cationic groups must undergo a reaction which destroys or eliminates the cationic charge, e.g., nucleophilic displacement, elimination, hydrolysis, oxidation, reduction or ylid reactions, at conditions which do not deleteriously affect the desired membrane characteristics of the resulting product.

Preferred cationic moieties include sulfonium, quaternary ammonium, phosphonium, pyridinium, thiazolinium, imidazolinium, sulfoxonium, isothiouronium, azetidinium, or diazonium groups. Techniques and processes for making compounds bearing the desired moieties are well-known in the prior art. U.S. Pat. Nos. 2,676,166; 2,891,025; 3,269,991; 3,329,560; 3,429,839; 3,544,499; 3,636,052; 3,723,386; 3,962,165; 4,002,586; 3,804,797; 4,337,185; 4,383,073; 4,426,489; 4,444,977; and 4,477,640 are incorporated herein by reference to illustrate techniques for making such compounds.

Especially preferred cationic reactants contain a cationic sulfur or nitrogen moiety which is bonded to carbon atoms and optionally one heteroatom (N, O or S). The cationic nitrogen should advantageously not be bonded to hydrogen. Illustrative preferred cationic reactants are detailed in the examples.

The relative reactivity of the cation reactants varies widely. Generally, reactivity of onium compounds substituted with like groups varies as follows from most to least reactive compounds:

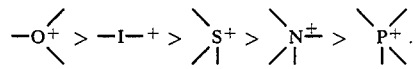

Alkyl substituted oniums are generally somewhat less reactive than aryl substituted onium compounds. Benzylic substituted compounds are particularly reactive. Heteroatoms substituted with activating groups are especially preferred. Groups which can activate the onium moiety are described in U.S. Pat. No. 4,225,407 at column 4 with regard to quaternary ammonium cations. These same techniques are generally applicable to other cations and are incorporated herein by reference.

The reactive cationic compounds can bear one or more cationic moieties with the remainder of the compound being a hydrocarbon, inertly substituted hydrocarbon, siloxane, phosphazene or other moieties compatible with the function and composition of the resulting permselective membrane. Preferably, the cationic compound does not bear any substituents or contain any covalent bonds which would be adversely affected by the conditions and compounds to which the membrane discriminating layer is subjected. Inertly-substituted hydrocarbons denotes that the remainder of the compound is not prone to deleterious side reactions.

Preferably, the reactive cationic compounds bear an average of more than one cationic moiety per compound. Illustrative of preferred reactants are vinyl addition polymers bearing a plurality of reactive cationic moieties. The number and placement of the cationic groups in the compound can affect the membrane characteristics of the ultimate product. It is well within the skill in the art to empirically determine the cationic reactants which afford membranes of optimum characteristics in specific applications.

The presence of hydrophobic groups and in addition to the cationic groups other hydrophilic moieties can also affect the selectivity, integrity and permeability of the ultimate product. For example, in some preferred embodiments of this invention it is desirable that the cationic compound form thin, uniform films on a substrate. In such embodiments it is desirable that the cationic compound be sufficiently hydrophobic in character to form the desired films.

The term reactive cationic compound as used herein refers to compounds bearing at least one cationic group. Preferably, the reactive cationic groups are substantially completely ionized in water over the entire pH range from about 2 to about 12. The cationic group preferably is covalently bonded to at least one: (a) hydrophobic moiety, (b) polymerizable group or (c) polymer backbone bearing a plurality of reactive cationic groups.

The reactive cationic group can undergo any one of the variety of reactions which eliminate the charge. The identity of the cationic group will determine its susceptibility to specific reactions and the nature of the product formed. The preferred cationic reactants are susceptible to nucleophilic displacement reactions with anionic nucleophiles at least as reactive as an acetate ion at temperatures less than 160° C. Desirably the reaction takes place in the presence of water and results in the formation of a covalent bond between the moiety bearing the reactive cationic group and the one bearing the nucleophilic compound.

The cationic group can be part of an acyclic, cyclic or heterocyclic moiety. Illustrative acyclic onium groups are:

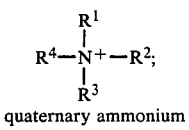
quaternary ammonium

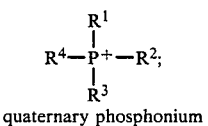
quaternary phosphonium

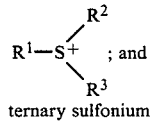
ternary sulfonium

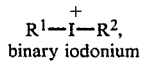
binary iodonium wherein $R^1$, $R^2$, $R^3$ and $R^4$ are each independently monovalent hydrocarbon radicals, monovalent inertly-substituted hydrocarbon radicals or monovalent hydrocarbon radicals bearing reactive groups.

Illustrative cyclic onium ions include:

aziridinium

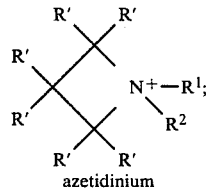
azetidinium

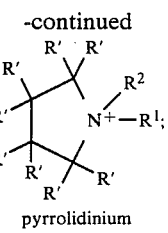
pyrrolidinium

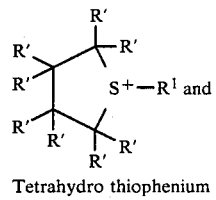
Tetrahydro thiophenium

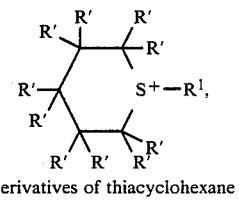
derivatives of thiacyclohexane wherein $R^1$ and $R^2$ as defined as hereinbefore and $R'$ is independently at each occurrence —H or selected from the same monovalent radicals as $R^1$. The anion is not shown, but of course a counterion will be present.

The cyclic sulfonium moieties can be a 5-, 6- or 7-member ring and optionally may bear alkyl, chloro, bromo, alkoxy or other substituents which do not deleteriously affect the membrane formation reaction.

Illustrative cyclic aromatic cationic groups include aromatic nitrogen groups, such as:

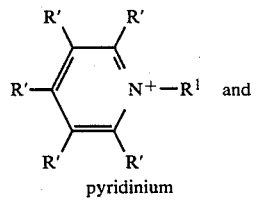
pyridinium

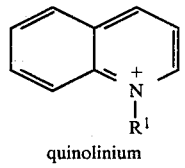
quinolinium and other condensed ring systems.

The reactive cationic compounds include acyclic and heterocyclic ions with two or more heteroatoms. Illustrative of such compounds are:

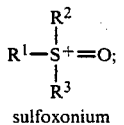
sulfoxonium

-continued

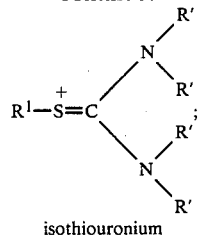
isothiouronium

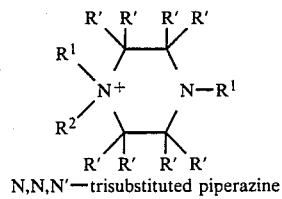
N,N,N'—trisubstituted piperazine

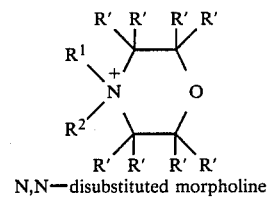
N,N—disubstituted morpholine

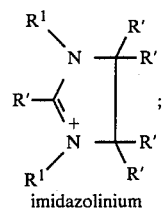
imidazolinium

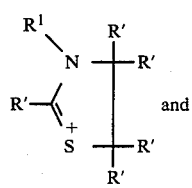
and

-continued
thiazolinium

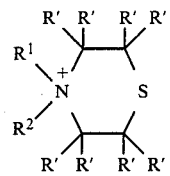
derivatives of thiomorpholine

As indicated previously, the cationic reactant can be present as hydrophobes, polymerizable reactive cationic compounds or polymeric compounds. Illustrative of hydrophobes are:

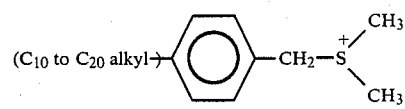

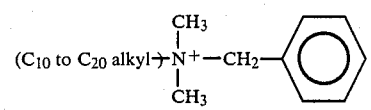

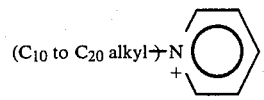

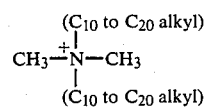

Illustrative of polymerizable reactants are:

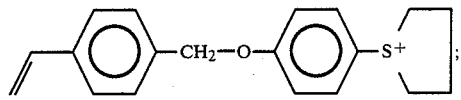

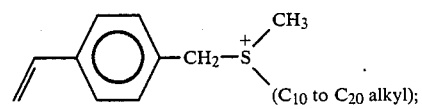

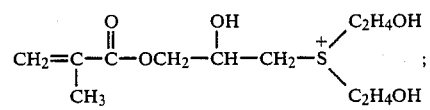

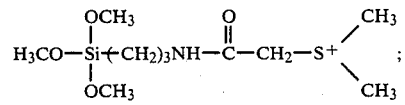

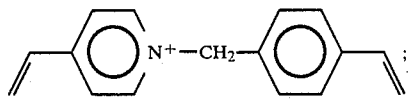

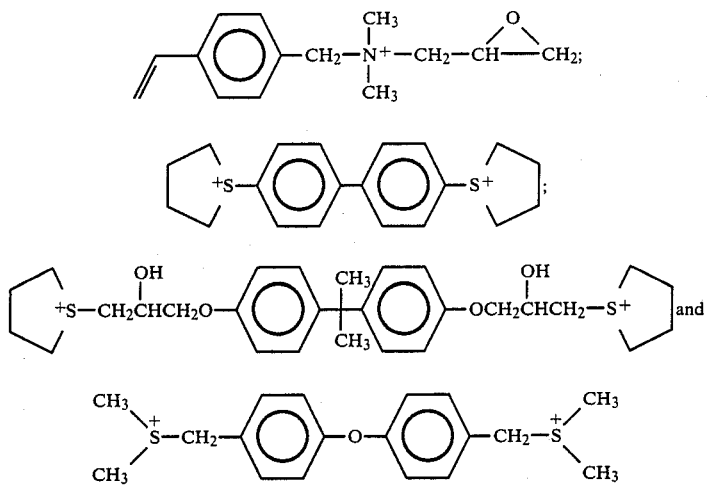

Other compounds of interest are described in U.S. Pat. Nos. 4,426,489; 4,477,640 and 4,444,977.

The preferred polymeric reactants comprise repeating moieties represented by the formula $$\mathrm{+T+}_{|}^{Q^+}$$

wherein T is a trivalent hydrocarbon or substituted hydrocarbon moiety and $Q^+$ is a monovalent group including a reactive cation. For purposes of illustration, exemplary moieties for both T and $Q^+$ are tabulated hereinafter:

TABLE A

| T | $Q^+$ |
|---|---|
|  | 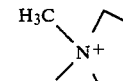 |

TABLE A-continued

| T | $Q^+$ |
|---|---|
| | 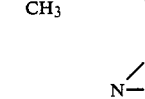 |

Illustrative of other polymeric reactants are:

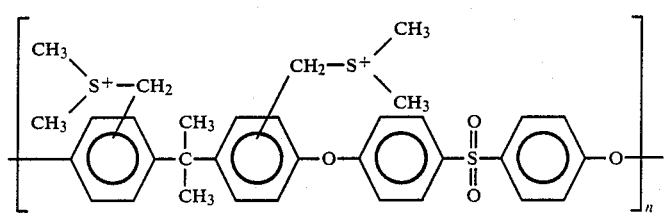

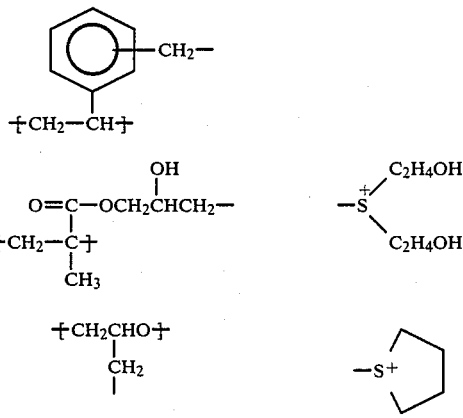

and derivatives of cellulose or a starch bearing at least one pendant benzyl dimethyl sulfonium group.

A counterion (anion) will be present to balance a cationic charge. The identity of the anion is generally not critical if a coacervate is to be formed, so long as the counterion does not deleteriously affect the membrane to be formed. Generally, chloride, hydroxide and bicarbonate salts are preferred, with carboxylate salts being most preferred. Carboxylate, hydroxide and bicarbonate salts are preferred in coacervate formation. In some embodiments of the invention the anion can react with the cationic groups at elevated temperatures, (preferably less than 160° C.), but this is not generally preferred unless the counterion is the nucleophilic reactant. The counterion is generally conveniently changed as desired by reaction with an anion exchange resin. The anion selected should not render the cationic compound water incompatible.

A carboxylate anion is especially preferred in embodiments of the invention in which a reactive sulfonium salt is coated on a substrate from a solution and then dried in the essential absence of a reactive nucleophile other than the anion. The carboxylate anion is preferably the salt of a carboxylic acid which does not adversely affect the water compatibility of the cationic reactant. More preferably, the carboxylate anion is preferably a salt of a $C_1$ to $C_8$ carboxylic acid, a $C_2$ to $C_{10}$ dicarboxylic acid or $C_3$ to $C_{10}$ tricarboxylic acid.

Nucleophilic Reactants

Nucleophilic compounds as the term is used herein refer to compounds which react with the reactive cationic compounds described hereinbefore to yield products by formation of covalent bonds with extinction of cationic charge. These reactants are well known, as illustrated in J. March, *Advanced Organic Chemistry*, 3rd Ed., John Wiley & Sons, pp. 255-446 and 576-607 (1985). Generally, the nucleophilic group reacts in a conventional nucleophilic displacement to form a covalent bond with a carbon atom originally bound to a heteroatom in the cationic reactant.

Not all nucleophilic groups will react with any reactive cationic compound under conditions which are not deleterious to membrane formation. The selection of a nucleophilic reactant requires consideration of: (1) the type of non-ionic bond desired in the membrane; (2) the reactivity of the cationic compound, and (3) the process and conditions employed in forming the membrane.

Nucleophilic compounds useful in the subject invention can generally be selected from one of three groups: (1) nucleophilic anions of inorganic acids or water; (2) nucleophilic anions derived by removal of a labile hydrogen from organic compounds bearing such an active hydrogen, and (3) primary or secondary amines. Illustrative of the nucleophiles derived from inorganic acids or water are bromide, chloride, iodide, hydroxide, sulfite, bisulfite, phosphate, phosphite, hydrosulfide, sulfide, cyanide, cyanate and thiocyanate. Illustrative of the nucleophilic anions derived from compounds bearing active hydrogens are the conjugate bases of carboxylic acids, organic phosphonic acids, alcohols, phenols, mercaptans, thiophenols, amides, sulfonamides and phosphoric acid partial esters. Any of the foregoing nucleophilic groups can bear substituents which do not deleteriously affect the membrane or reaction by which the membrane is formed. Desirably, nucleophilic anions are selected that form adducts with one of the substituents on a heteroatom of the cationic compound, when the cation and nucleophile are present together in the presence of a solvent or diluent and the solvent or diluent is removed at a temperature less than 160° C.

Illustrative of the amine nucleophiles are meta-phenylene diamine, methylene dianiline, ethylene diamine, diethylene triamine and other polyamines. Compounds bearing a single amine group are operable but generally not preferred. Polymeric amines, e.g., polyethylenimine and hydrolyzed poly(ethyl-2-oxazoline), are especially preferred. Preferably, the amines are water soluble or dispersible at a slightly alkaline pH. The amine nucleophiles are especially useful for reaction with polysulfonium compounds. Amines, as well as hydrophilic inorganic nucleophiles, are particularly useful in a single coating formulation containing both cations and nucleophiles, since a coacervate will not be formed.

The polymeric reactants can be derived from naturally occurring polymers, such as tannin, modified natural polymers, such as carboxymethylcellulose, or synthetic polymers, such as acrylates. Tannic acid, for example, can be applied to a substrate as a colloid and then converted to its nucleophilic form by raising the pH to 7 or higher.

The nucliophilic anion can in some embodiments of the invention be present as a counterion for the cation present. For example, hydroxide, bicarbonate and conjugate bases of citric acid, pivalic acid or other carboxylic acids are reactive nucleophiles. A single compound can bear reactive cations and include nucleophilic counterions.

The nucleophilic reactants, like the reactive cationic compounds, may be present as: (1) a hydrophobe bearing a nucleophilic group, (2) a monomer bearing either (a) a single nucleophilic reactant and a polymerizable group or (b) two or more nucleophilic groups or (3) a plurality of nucleophilic groups on a polymer.

The anionic organic nucleophiles are especially preferred as reactants. The relative reactivity of certain of these preferred nucleophiles from most to least reactive are:

thioarylates > thioalkylates > arylates > alkylates > carboxylates.

These nucleophiles are preferred because they are capable of forming coacervates, i.e., electrostatically bonded aggregates including ionically bonded polyelectrolyte complexes. Reactants bearing a plurality of anionic organic nucleophilic moieties, i.e., polyfunctional nucleophiles, are especially preferred because these result in products of increased molecular weight and/or crosslinking of the product.

As used herein: a thioarylate is the anionic conjugate base of an aryl thiol compound; thioalkylate is the anionic conjugate base of an alkyl thiol compound; arylate is the anionic conjugate base of an aryl alcohol compund, alkylate is the anionic conjugate base of an alkanol, and carboxylate is the anionic conjugate base of a carboxylic acid.

The nature of the covalent bond formed in making the membrane depends on the specific reactants. In general for most cationic reactants, reaction with a carboxylate ion results in an ester bond, reaction with alkoxide or phenate (or other arylates) yields an ether bond and reaction with thiolate or mercaptide groups creates a sulfide bond. The reactants and process conditions should be selected to create membranes stable at the conditions prevailing during use of the membrane.

Zwitterionic Membrane Precursor Compounds

Zwitterionic compounds are a class of preferred reactants for certain processes of this invention. The zwitterion compound contains both a cationic group and anionic group, which can react. If the anionic group is protonated, the compound reacts as a reactive cationic compound. Zwitterionic compounds also can bear reactive cationic groups and non-nucleophilic anionic groups, such as a sulfonate group.

In one preferred embodiment of the present invention, the reactive cationic compound is a cyclic sulfonium zwitterion monomer. As used herein, the term cyclic sulfonium zwitterion monomer or more simply zwitterion monomer refers to both monofunctional and polyfunctional monomers.

Preferred are aryl cyclic sulfonium zwitterions, e.g.,

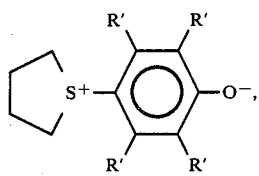

and aliphatic cyclic sulfonium carboxylate zwitterions, e.g.,

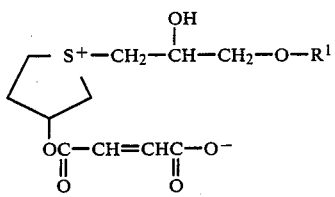

and like compounds prepared by reaction of a sulfide with an oxirane, such as an epoxy resin. The cyclic sulfonium moieties can be a 5-, 6- or 7-member ring and optionally may bear alkyl, chloro, bromo, alkoxy or other substituents which do not deleteriously affect the membrane formation reaction. It has been observed that the aryl cyclic sulfonium zwitterions are generally most reactive when the sulfonium is meta relative to the anion substituent on the aryl group.

Representative examples of aryl cyclic sulfonium compounds include 1-(4-hydroxy-3-methylphenyl)-tetrahydrothiophenium hydroxide inner salt (also called o-cresol zwitterion) and 1-(4-hydroxy-3-(2-hydroxyethoxy)phenyl)-tetrahydrothiophenium hydroxide inner salt (also referred to as o-hydroxyethoxy phenol zwitterion).

Monofunctional monomers suitable for use in the present invention may be represented by the general formula

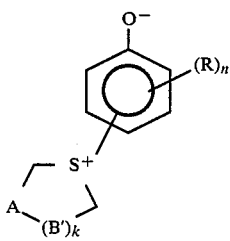

wherein R represents hydroxyl, chlorine, bromine, an alkyl having from 1 to about 16 carbon atoms (preferably from 1 to 4), or an alkoxy having from 1 to about 12 carbon atoms (preferably from 1 to 4), said alkyl and alkoxy being optionally substituted with a hydroxyl group; each sulfonium group is preferably ortho or para to the phenoxide group; $A'$ and $B'$ independently are —$CH_2$— or —$CH(R''')$— wherein $R'''$ represents hydroxyl or an alkyl or hydroxyalkyl having from one to about eight carbon atoms; and k is 1 or 2. The sulfonium group in formula I can operably be meta to the phenoxide group and the compound is more reactive in this configuration.

Polyfunctional monomers suitable for use in the present invention may be represented by the general formula

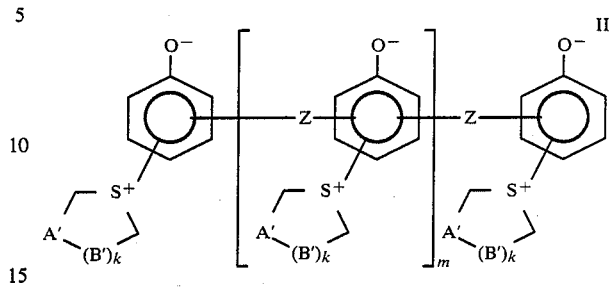

wherein Z represents the bridging groups —O—, —S—, —$CH_2$—, —$CR_2''$— where $R''$ is an alkyl having from one to about four carbon atoms, or —O—$(C_aH_{2a-b}(OH)_b)$—O— where "a" is an integer of from 1 to 6 and "b" is an integer from 0 to 4; each sulfonium group is meta or preferably ortho or para to the phenoxide group; $A'$ and $B'$ independently are —$CH_2$— or —$CH(R''')$—wherein $R'''$ represents hydroxyl or an alkyl or hydroxyalkyl having from one to about eight carbon atoms; m represents 0, 1, 2 or 3; and k is 1 or 2.

Representative polyfunctional monomers within the scope of formula II include 1,1'-((1-methylethylidene)bis(6-hydroxy-3,1-phenylene))bis(tetrahydrothiophenium hydroxide)bis (inner salt) which is also referred to herein as p-bisphenol A zwitterion; 1,1'-dimethylene-bis(oxy-4-hydroxy-2,1-phenylene))bis(tetrahydrothiophenium hydroxide)bis (inner salt); 1,1'-(methylene-bis(4-hydroxy-3,1-phenylene))bis(tetrahydrothiophenium hydroxide)bis(inner salt); 1,1'-((1-methylethylidene)-bis(6-hydroxy-3,1-phenylene))bis(3-hydroxytetrahydrothiophenium hydroxide)bis(inner salt); and 1,1'-((2,3,4,5-tetrahydroxyhexamethylene)bis-(oxy-4-hydroxy-2,1-phenylene))bis(tetrahydrothiopheniumhydroxide)bis (inner salt) which is also referred herein as mannitol diphenolic zwitterion.

The preparation of monofunctional and polyfunctional zwitterion monomers corresponding to formula I wherein the sulfonium group is ortho or para to the phenoxide is described in U.S. Pat. No. 3,636,052; U.S. Pat. No. 3,723,386, U.S. Pat. No. 4,089,877 and Jour. Paint Tech., Vol. 46, No. 588, January 1974, p. 41. These patents and article are incorporated herein by reference.

Zwitterionic or amphoteric polymers, bearing both onium and anionic nucleophilic groups, are operable as reactants. The units comprising the chain may be individually cationic, anionic or zwitterionic. Illustrative of these polymers is one having the following average structure

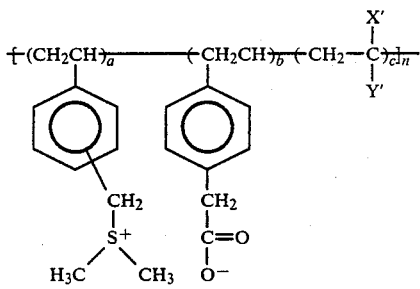

where $a+b+c=1$, n = 1 to 10,000, $a \geq b$, c = 0 to 0.8, X' and Y' are inert substituents which an ethylenically unsaturated compound may contain. The moieties can be distributed randomly, in sequences or blocks.

Another illustrative polymer zwitterionic reactant can be represented by the formula

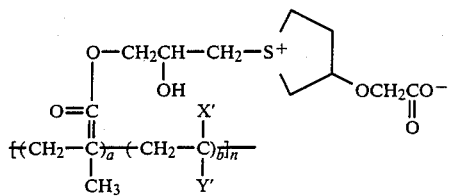

where b is 0–0.9, $a+b=1$ and X', Y' and n are the same as defined immediately hereinbefore.

A third illustrative polymer has the average structure

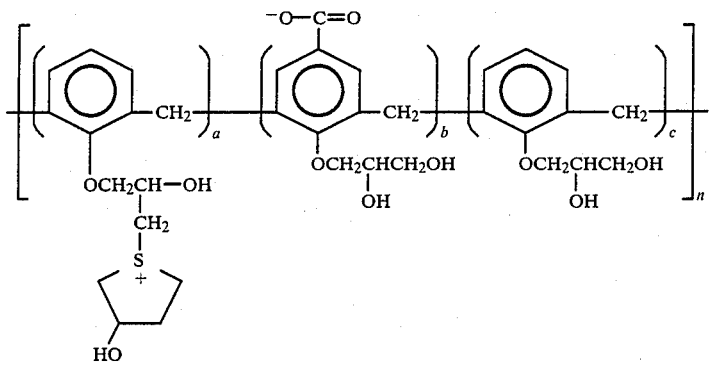

wherein $a+b+c=1$, $a \neq 0$, $b \neq 0$ and c is in the range from 0 to 0.8.

Supporting Surface

The discrimination layer of the supported semi-permeable membranes prepared in accordance with the instant invention generally is relatively thin. Typically, the cured membrane excluding any porous supporting layer is from about 0.01 to about 10 microns thick. Preferably, the discrimination layer of the membrane is from about 0.05 to about 5 microns thick.

In part because of the desired thinness of the discriminating layer, it is necessary to provide support to the membrane when the membrane is employed in a separation apparatus. In one embodiment, the peripheral area of the membrane is affixed to a framing structure which supports the outer edge of the membrane. The membrane can be affixed to the framing structure by a clamping mechanism, adhesive, chemical bonding or other techniques known in the prior art, The membrane affixed to the frame can then be sealingly engaged in the conventional manner in a vessel so that the membrane surface inside the framing support separates two otherwise non-communication compartments in the vessel. The skilled artisan will recognize that the structure which supports the membrane can be an integral part of the vessel or even the outer edge of the membrane.

In another embodiment of the invention, the membrane is supported on a porous substrate or structure. This porous supporting layer is characterized in that it does not significantly impede the transport across this layer of all components of a fluid in contact with the porous layer. In one preferred embodiment of the invention, the supportiong layer can comprise a discriminationg layer which impedes transportation of some fluid components to the membrane formed from the reactive cation and nucleophile. In another embodiment, the supporting layer can be a metal or polymeric plate with a plurality of holes or open cells. Preferably, a porous support layer possesses a high porosity as this enhances the permeability of the membrane.

In a preferred embodiment of the invention, the porous supporting layer is a very porous polymer membrane. Illustrative of such polymeric supporting layers are microporous cellulose ester and microporous polysulfone membranes. Such membranes are commercially available under the trade names MILLIPORE, PELLICON and DIAFLO. Where such supporting membranes are thin or highly deformable, a frame may also be necessary to adequately support the semi-permeable membrane. In one especially preferred embodiment, the polymeric supporting layer is a hollow fiber of a microporous polymer such as polysulfone, polyethersulfone, polycarbonate, polybenzimidazole, cellulose acetate or other cellulose esters. The hollow fiber itself provides adequate support for the semi-permeable membrane layer coated on the inside or outside surface of the fiber. Polysulfone hollow fibers are the most preferred support for the membranes described herein.

Methods of Making Membrane

The reaction of the cationic and nucleophilic reactants is conducted so as to form a thin discriminating layer on a support or substrate which provides the desired mechanical strength. The reactive cationic and nucleophilic groups can be present on the same or different compounds.

When both cationic and nucleophilic groups are attached to the same compound, the coating which reacts to form the membrane discriminating layer can be deposited on the substrate from a single coating formulation. Preferably, the compound bearing cationic and/or nucleophilic groups is water compatible, in which case an aqueous coating solution is advantageously used. Water compatible denotes that the compound is soluble or dispersible in water without formation of poorly dispersed gels, agglomerates or precipitates which are deleterious to the formation of a continuous, thin, defect-free coating on the substrate.

In the preferred embodiment of the invention in which an organic anionic nucleophile is employed, the cationic and nucleophilic compounds will generally be incompatible in a single aqueous formulation. If the reactants are not compatible, they can be applied in separate formulations. In general, an organic anionic nucleophile will be compatible with the cationic reactant, if at least one is a low molecular weight hydrophilic ion with a small number, typically less than five, preferably two or three, of the ionic substituents.

Separate formulations of the reactants should also be employed when the reaction used to form the membrane is rapid. The separate formulations may be applied simultaneously or sequentially as described hereinafter.

The most reactive nucleophiles, e.g., thioarylates and thiolates, are preferred for reaction with the more stable cationic reactants or with other more reactive cationic compounds at relatively low reaction temperatures optionally in the presence of water. The presence of highly reactive cationic compounds, such as sulfonium, with strong nucleophiles together in a single diluent or solvent for both reactants results in a short storage life. However, one or both of the reactants can operably be present in a latent form, e.g., isothiuroniums can be converted to thiolates, as in U.S. Pat. No. 4,431,768, or diazonium cations can be formed in situ.

In addition, some compounds, such as vinyl addition polymers of isopropenyl oxazoline, will protonate in the presence of carboxylic acid groups. A coacervate forms between the resulting ammonium cation and carboxylate groups. This coacervate can form covalent bonds in the manner of this invention.

One important property of the coating formulation is the ability to form thin, continuous films of generally uniform thickness without defects or holes. To form such films, the coating formulation must spread readily across the surface of the substrate. For the desired spreading to occur, the spreading coefficient, i.e., the difference between the work of adhesion and the work of cohesion of the liquid, must be positive. For many water-soluble materials, surface tension increases as the solvent evaporates. Consequently, the coating formulation frequently has a tendency to draw together as it dries. The presence of small amounts of compatible organic or fluorochemical surfactants, preferably 0.05 to 0.3 percent on a solids basis by weight, alleviates this problem. Advantageously, the surfactants should be nonionic or bear charges like those of other components of the formulation. Alternatively, the cationic and/or nucleophilic reactants can include moieties which impart surface activity to the coating formulation. For example, the inclusion in a polymer of hydrophobic groups may decrease surface tension and increase viscosity of the formulation as it dries. Illustrative of such moieties is

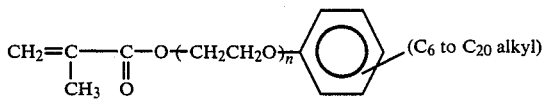

wherein n is an integer from 1 to 50. U.S. Pat. No. 3,965,032, in the context of linear interpolymeric interfacially spreading polyelectrolytes, describes combinations of monomers which promote film formation. These teachings are incorporated herein by reference.

Formulation of a single or two compatible reactive compounds in a suitable diluent can be applied to the subtrate by conventional coating techniques. The diluent can be any solvent or compatible diluent which does not adversely affect the reactants, membrane support or the membrane to be formed. Conveniently, water or an aqueous diluent is employed. Small amounts of surfactants can improve the uniformity of the coating. The coating is applied to the substrate by conventional techniques, such as adsorption, dipping, casting, spraying, wiping rolling or filtration of the coating solution through the substrate. The excess coating is desirably removed by draining or drawing a smooth instrument, e.g., a blade or roller, across the substrate surface. Where necessary, reactive compounds not compatible in a single diluent can be applied in sequential coats. Multiple coats can also be applied to eliminate defects. Multiple coats are particularly preferred in the preparation of gas separation membranes. Preferably, each coating is dried and partially cured before depositing subsequent coats. The temperature, concentration and pH of the coating solution are selected so as to avoid premature reaction and afford the desired film-forming properties. These operating parameters are generally not critical so long as the resulting membrane is not deleteriously affected. Ambient temperatures, i.e., 10° to 30° C. are generally conveinient, although other temperatures are operable. A concentration of about 0.001 to about 5 weight percent of the reactants is preferred. The pH is selected so that the reactants are not deleteriously affected.

In a preferred embodiment of the invention, separate coating formulations containing cationic reactants and anionic nucleophiles respectively are brought together on the substrate surface to form a coacervate layer at the interface. Subsequent reaction of the reactive anionic and cationic groups creates convalent bonds and a water-insensitive polymer layer. In general, water is removed and the coating heated to facilitate reaction to a water-insensitive layer. Certain highly reactive nucleophoiles and cations can react in the aqueous phase. Water-insensitive denotes that the layer is not water-soluble or swollen by liquid water to a degree which adversely affects permselectivity of the layer.

In sequential coating of reactive compounds, the coating of the first reactant, whether cationic or nucleophilic, is typically applied and then dried to form an adherent, uniform, comparatively thin layer on the substrate. A coating of the second reactant is then applied, advantageously washed with additional diluent and the diluent removed or coating otherwise treated to promote reaction. Advantageously, if a coacervate is to be formed, it should occur before washing the coating or removal of diluent fromt the second coating. This procedure can be repeated as desired in multiple coatings. Advantageously, the ionic reactant in the first coat is a high molecular weight film-forming polymer, preferably bearing hydrophobic substituents to enhance its film forming properties without rendering the reactant water incompatible.

In another embodiment of the invention, separate formulations of the cationic and nucleophilic anionic reactants are applied to opposite sides of a support that is permeable to at least one of the reactants. Preferably, a coacervate layer is formed at the interface where the reactants make contact. The excess formulations are then removed to leave the thin coacervate. Preferably, highly reactive combinations of the reactants and conditions which promote rapid reaction are employed to limit the thickness of the coacervate layer.

The preferred reactants used in the formation of the coacervate coatings are separately water compatible, but together form water-insoluble, ionically-bonded adducts. In order for a coacervate to form the reactants must bear groups with opposite charges at the pH at which the groups are in contact. In one preferred embodiment of the invention, cations present in the coacervate react via nucleophilic displacement with the nucleophilic anions present. Advantageously, covalent bond formation occurs at least in part while the coacervate layer is in contact with the aqueous medium. The reaction of highly reactive sulfonium ions with weakly nucleophilic carboxylate ions in an aqueous medium is relatively slow, in many instances requiring twenty-four hours or more to develop significant covalent bonding. However, this reaction rate may be practical in many applications, such as applying a discriminating layer on a reverse osmosis membrane to enhance rejection. In contrast, sulfonium groups react with thiolate ions in water at ambient temperatures to form covalent bonds in a matter of seconds.

The water-compatible ionic compounds preferred as reactants include water-soluble, hydrolytically stable monomers bearing from 2 to 10, more preferably 2 to 4, reactive cations or reactive nucleophiles per molecule. Preferably, the compounds bear exclusively nucleophilic or exclusively cationic groups. The reactants desirably have molecular weights in the range from 100 to 1000 (as determined by gel permeation chromatography), more preferably 200 to 600.

Another class of preferred reactants are polymeric, water-compatible compounds including reactive cationic polyelectrolytes, water-soluble nucleophilic polymers, water-dispersible bound charge latexes, i.e., hydrophobic polymer particles dispersed in water with colloidally stabilizing ionic groups bound to the polymer, and non-ionic, water-soluble polymers and latexes bearing a plurality of primary and/or secondary amino groups. The water-soluble polymers generally will have molecular weights in the range from about 500 to about 10,000,000, preferably about 1000 to about 1,000,000. Water soluble means that the polymer is soluble to a concentration of at least 0.1 weight percent at 25° C. The dispersible polymers preferably have a mean particle diameter in the range from about 10 to about 1000 nanometers. The ionic polymers preferably have a charge density in the range from about 0.01 to about 10 milliequivalents ionic functionality per gram of polymer. In another preferred embodiment of the subject invention, the substrate or support itself bears reactive cationic or nucleophilic groups on at least one surface. Such substrates can be prepared by resort to a variety of techniques known in the art. Reactive monomers, such as arylic acid or vinylpyridine, can be grafted on to the substrate and the desired nucleophile, e.g., carboxylate or cation, e.g., pyridinium, derived therefrom. The substrate can be made from a polymer or a polymer blend bearing reactive groups containing such a reactive polymer. The asymmetric microporous support can be prepared in accordance with U.S. Pat. No. 3,615,024 or other conventional techniques. Conveniently, a water-insoluble polymer is dissolved in a solvent for the polymer and a non-solvent for the polymer which is miscible with the polymer solvent is added. The non-solvent is preferrably compatible with the polymer in the mixture with the polymer solvent, but is incompatible in the presence of water.

Alternatively, the polymer substrate can be a copolymer derived from at least one monomer bearing reactive cationic or nucleophilic moieties. For example, the substrate can be a microporous copolymer of an ethylenically unsaturated monomer reacted with from about 1 to about 10 weight percent acrylic acid Microporous substrates can be prepared in accordance with the general teachings in U.S. Pat. No. 4,020,230, which is incorporated herein by reference.

Copolymers can also be prepared which include moieties which are readily converted into cationic or nucleophilic reactants. Functional comonomers which can be converted to reactive cationic groups by techniques known in the art include vinyl benzyl halide and other ethylenically unsaturated active halogen compounds, glycidyl methacrylate and other vinylsubstituted oxiranes, vinyl pyridines, dimethylaminoethyl methacrylate and other vinyl amines.

Monomers that can be converted to nucleophilic derivatives after copolymerization include acryloyl chloride, maleic anhydride, vinyl benzyl thioacetate and other hydrolyzable compounds containing polymerizable vinyl groups or unsaturation. Polymers containing carboxylic acid groups can be converted to reactive anionic nucleophiles by raising the pH to convert acid groups to carboxylate moieties.

In a modification of the aforementioned process, an anionic nucleophilic polymer is present in the spinning formulation. A reactive cationic compound is added to the spin quench or leach bath so that a coacervate is formed on the freshly spun polymer contemporaneous with these steps. To illustrate this modification, up to about 10 weight precent carboxymethylcellulose can be added to a cellulose triacetate spinning dope otherwise as in U.S. Pat. No. 3,532,527. The spin blend is formed into a hollow fiber and passed through a water bath containing up to about 1 weight percent vinylbenzyl dimethyl sulfonium bicarbonate.

In yet another embodiment of this invention a water-permeable membrane or substrate is coated first with a layer of an ionic polymer of a first charge to which the substrate is impermeable followed by a coating of a reactive water-compatible polymer, hydrophobe, or monomer of opposite charge to the first charge. The membrane is optionally treated in an assembled membrane device or a subassembly of a plurality of membranes which can be readily fabricated into a membrane divice. In a preferred method, the feed side of the membrane is contacted with a dilute (preferably about 0.01 to about 50 parts per million (ppm) by weight) aqueous solution of a first polymeric ionic reactant while maintaining a chemical potential across the membrane, so as to transport water through the membrane. Generally, dilute solutions of 0.1 to 5 ppm by weight are preferred. Higher concentrations are operable, as long as the viscosity is not so high as to adversely affect the membrane formation. Preferably the chemical potential gradient is achieved by a pressure differential across the membrane, operably 0.1 to 1,500 psi, preferably about 100 to about 800 psi.

Advantageously, the coating solution includes 50 to 5,000 ppm of NaCl or other inorganic solute, with zero to 20,000 ppm solute being operable with the proviso that the coating polymer must be compatible with the resulting solution. Preferably, contact with the first solution is maintained until either the flux through the membrane or salt rejection declines to a new steady state value. Desirably, the coating solution is circulated over the membrane surface to be treated. The feed side of the membrane is then washed with water to remove any excess of the ionic polymer. A dilute aqueous fromulation of a second reactive ionic polymer or monomer opposite in charge to the first is brought into contact with the feed side of membrane with a chemical potential applied to cause permeation of water. Once again, the chemical potential is desirably maintained until a steady state flux or salt rejection is approached. The excess of the second ionic polymer or monomer is then removed with a water wash.

If the first reactive ionic polymer and second reactive polymer or monomer are optimally selected, they are believed to first form a coacervate and then react to form sufficient covalent bonds via nucleophilic displacement to render the product essentially water insensitive and fix it on the substrate. Advantageously, sufficient ionic bonds are converted to covalent bonds to render the discriminating layer water incompatible in a finite time.

Preferably, the membrane treating compounds in the first formulation deposited should have a high affinity for the surface to be coated, such that they persist on the surface until affixed by formation of covalent bonds. However, compounds with low affinity for the treated surface can be used provided the chemical potential gradient maintained until the second reactant in a two-step process has been introduced to form the coacervate. In addition to imposition of a pressure differential, other methods of producing the desired chemical potential gradient can be employed. Differences in temperature, concentration or electrical potential are also operable.

For example, the membrane discriminating layer can be electrodeposited on a supporting layer which is electroconductive or ion permeable. The electrodeposition technique is similar to that described in U.S. Pat. No. 3,567,613. In general, an aqueous formulation of the cationic reactant is brought in contact with the side of the support to be coated and a negative electrode disposed on the opposite side of the support. A positive electrode is placed in the aqueous coating formulation and a direct current potential sufficient to pass current is applied across the electrodes for sufficient time to deposit the cationic reactant in the desired thickness.

In one preferred embodiment of the invention, a first coating of a hydroxyethyl methacrylate (HEMA), methacrylic acid (MAA) and optionally p-nonyl-phenoxynonaethoxy ethyl methacrylate (9N-10MA) copolymer or terpolymer or a 95 percent vinyl acetate/5 percent crotonic acid copollymer is applied in an aqueous solution at a pH where significant carboxylate functionality is present to a substrate with an applied chemical potential. A second coating is then applied of a HEMA/VBDMS+Cl−/9N-10MA polymer, wherein VBDMS+Cl− is vinylbenzyl dimethyl sulfonium chloride. Preferred weight ratios of HEMA/MMA/9N-10MA in the first coating are 80:10:10 or 90:10:0. Preferred weight ratios in the second coating are 60:30:10 or 66:34:0 for HEMA/VBDMS+Cl−/9N-10MA. Alternatively, the compositions of the nominal first and second coating can operably be applied in reverse order.

In general, for reverse osmosis membranes the charge density of the first coat is advantageously not greater than the charge density of the second coat. For, example, the charged moiety in the first coat whether anionic or cationic can operably constitute 10 mole percent of the polymer in the first coat and the charged moiety in the second coat can constitute 25 mole percent of this second coating material. However, significant reduction in flux were observed when the charge densities between the first and second coatings were reversed.

The selection of the first and second ionic reactants and the reaction conditions will determine the characteristics of the ultimate product. The rate of formation of the coacervate may affect the membrane characteristics. Generally, coacervates which form quickly and have low water content are preferred. Additionally, the chemical stability imparted to the membrane will be influenced by the reactants. The skilled artisan can readily determine empirically the reactants and reaction conditions best suited to specific separations.

It has been observed in treating cellulose ester reverse osmosis membranes that the cationic and anionic reactants can be applied in either order. Typically, best antifoulant behavior was achieved where the final coating was anionic. Of course, multiple sequential alternating treatments can be used in accordance with the subject method. The first and second ionic reactants are optionally each respectively mixtures of different reactive ionic groups of like charge. In one especially preferred embodiment of the invention for reverse osmosis membranes, an anionic first coat, a cationic second coat and an anionic third coat is employed.

The membranes resulting from the aforementioned sequential treatement of permselective membranes can be used for reverse osmosis, gas separations, pervaporation or even ultrafiltration, depending upon the specific composition of the membrane. If the membrane is to be used in aqueous or liquid separations, it can be stored in the wet state after the coacervate is formed until placed in operation. If the membrane used as a substrate normally requires drying by solvent exchange, solvent extraction or freeze drying before it is used for gas separation, it should be dried by these conventional techniques after the coacervate is formed. See, for example, U.S. Pat. No. 4,430,807, which is incorporated herein by reference. Otherwise, the membrane coated with the coacervate can be dried by heating optionally at reduced-pressure. The membrane generally may undergo some change in dimensions upon drying. Accordingly, if the membrane is to be dried it is desirable that the product of the cationic/nucleophilic reaction contain flexible segments which can tolerate moderate dimensional changes as occur during drying without loss of integrity. U.S. Pat. No. 3,965,032 describes moieties which impart flexibility in the context of colloidally stable dispersions of polyelectrolytes. These teachings are incorporated herein by reference.

The preferred membranes used as substrates for reverse osmosis are composite or asymmetric membranes having polyamide, cellulose ester or polyester discriminating layers and a salt rejection in the range from about 50 to about 99 percent using a 0.25 weight percent sodium chloride aqueous solution at 400 pounds per square inch gauge (psig). Other operable membranes useful as substrates are described in U.S. Pat. No. 4,214,020, which is incorporated herein by reference. Ultrafiltration membranes with a relatively high water flux and pore dimensions which impede passage of the first reactive coating are also preferred. More porous materials are also operable as substrates if first treated with a coating which substantially eliminates passage of liquid water through the pores.

In the aforementioned methods of forming membrane discriminating layers, a variety of techniques can be used to induce reactions forming covalent bonds with elimination of ionic groups. Water tends to stabilize ionic groups. Consequently, any technique that removes water from the system accelerates the elimination of ionic groups. Application of heat, radiation, certain catalysts, more reactive co-reactants or electrical potential can likewise promote the desired reactions. However, care should be taken to avoid unduly harsh reaction conditions which can promote undesirable side reactions or adversely affect the substrate or discriminating layer. Generally, the formation of covalent bonds is promoted by simultaneous moderate heating to temperatures less than 160° C., perferably less than 125° C., and drying. Excessive temperatures and prolonged heating are usually undesirable. In one preferred embodiment of the invention, the coating is dried, conveniently with hot air, but the supporting layer remains wet or hydrated.

In preparing membranes according to the invention, a casting or forming solution is prepared containing a reactive cationic compound and optionally a water-soluble or water-dispersible polymer or prepolymer having free nucleophilic groups in a water-miscible solvent system usually containing water.

In preparing composite membranes, forming solutions containing less than about 5 percent total solids are generally preferred. In forming unsupported membranes higher total solids are usually employed, the upper limit being determined by the viscosity of the casting solution. As already noted above, the solvent system is usually aqueous or water-dispersible. Suitable water-dispersible solvents include lower alkanols and alkylene glycols. Preferably, the forming solvent system is water-based; that is, the principal solvent is water. However, other water-dispersible or water-miscible materials may also be present in the forming solvent or the final coating formulation. Such materials may include water-miscible solvents such as lower alcohols or glycols and surfactants, extenders, or plasticizers. Such materials and their function in the forming solvent and finished membrane are well known to those skilled in the art and should require no additional explanation.

In carrying out the invention with certain polymers or prepolymers, such as those containing carboxylic acid groups for the active nuleophilic sites, at least part of the active groups preferably are in an ionic form, that is, in the form of a water-soluble salt. This increases the water-miscibility of the prepolymer. The particular salt is not critical to the invention so long as the cation asssociated with the carboxylic acid group does not interfere with the reaction between the carboxylic acid group and the reactive cationic group or adversely affect the properties of the finished membrane. Thus, ammonium salts generally have been employed and found suitable for use in this invention, but other salts such as potassium, sodium, etc., would also be satisfactory for this purpose.

In one embodiment, a composite membrane is prepared by casting a forming solution as a uniform coating on the porous support which forms the support layer for the finished membrane. Penetration of the coating solution into micropores in the porous supporting layer and the layer itself is operable so long as the desired thickness of the semi-permeable membrane is not exceeded but is not generally preferred. Where the supporting layer is a drilled plate, a material can be placed in the drilled holes which can be readily removed or dissolved from the semi-permeable membrane. The coated membrane is dried in an oven at a temperature sufficient to remove the water of hydration. Thus, unlike casting procedures used for conventional membranes, the drying and curing of the membranes may be carried out as a single step.

In forming unsupported membranes, the casting or forming solution can be spread on a surface from which the finished membrane may be readily separated. A convenient way of carrying out this operation is either by casting the membrane solution onto a support surface which may be dissolved away from the finished film following the drying and curing step or by casting the membrane onto a support having low surface energy, such as silicone-coated glass, or a surface to which the membrane will not adhere, such as mercury. These membranes can then be laminated on substrates, if desired.

Membrane Compositions

In the reaction of the nucleophilic and cationic reactants, at least two products are formed. The first product, $R^1$—A—$R'$, is generally an adduct formed between the nucleophile and one of the substituents on the heteroatom of the onium ion, i.e., the compound formed with the group leaving the heteroatom in one of the following reactions:

1. Wherein $R'$—A is a primary or secondary amine and the cationic reactant is preferably sulfonium

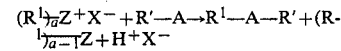

2. Where $R'$—A is an anionic reactant

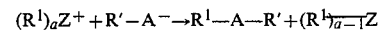

wherein a is the valence of the onium, $Z^+$ is the onium moiety, A is a nucleophilic group or anino, $X^-$ is a compatible anion and $R^1$ and $R'$ are as described hereinbefore. The second product is the uncharged species containing the heteroatom.

In certain preferred embodiments of the invention, $R^1$ and $R'$ are bonded to polymers and form part of the membrane. In another preferred embodiment of the invention, the substituents on the heteroatom of the onium ion together with the heteroatom form a ring structure. In the reaction with a nucleophile, an adduct is formed by elimination of one bond to the heteroatom while leaving the other bond intact. Consequently, the leaving group remains attached to the parent compound. Illustrative of such cationic reactants are the aryl cyclic sulfonium ions and the azetidinium ions. In other embodiments or the invention, either $R^1$—A—$R'$ or $(R^1)_a$—Z can be free, mobile molecules which can be extracted from the membrane by volatilization or use of solvents.

Both natural and synthetic polymers are known in the art to have permselective characteristics of potential value in making membranes. Only a limited number of such polymers haves been used to make membranes A list of some polymers evaluated previously in membranes is presented in D. R. Lloyd, *Materials Science of Synthetic Membranes*, pp. 64–70, ACS (1985). However, limitations in prior art techniques for fabricating membranes have prevented the practical realization of the permselective characteristics of many known polymers. The process of the subject invention for making membranes are particularly advantageous because many polymeric materials not deleteriously affected by the subject process can be functionalized with reactive cationic and/or nucleophilic moieties. The resulting functionalized polymer can be used in the processes herein disclosed.

Illustrative of polymers useful in the practice of this invention either as is or after modification are homopolymers and copolymers of ethylenically unsaturated monomers, e.g., styrene, substituted styrene, alkyl acrylates, alkyl methacrylates, vinyl esters, vinly ethers, butadienes, vinyl chloride, vinylidene chloride, acrylonitrile, methacrylonitrile, acrylamide, isopropenyl oxazoline, vinyl benzly chloride and $C_2$ to $C_{10}$ alkenes. Preferred as comonomers in such vinyl addition polymers are acrylonitrile, ($C_1$ to $C_{20}$ alkyl) acrylates, ($C_1$ to $C_{20}$ alkyl) methacrylates, hydroxyalkyl methacrylates, p-tert-butylstyrene, p-tert-butyl-(α-methyl)styrene, dicyclopentenyl acrylate, dicyclopentenyl methacrylate, styrene sulfonic acid, styrene sulfonamide, 2-sulfoethyl methacrylate, vinyl acetate, acrylamide, alkyl cyanoacrylate, methacrylamide, butadiene, isoprene vinyl pyrrolidone and vinyl benzyl chloride and its derivatives. Preferred polymers include ethylene/acrylic acid copolymer, ethylene/methacrylic acid copolymer, EPD rubber, polypropylene, poly(4-methyl-pentene-1), ethylene/vinyl acetate copolymer. ethylene/vinyl alcohol copolymer, styrene/acrylonitrile copolymer, styrene/methacrylic acid copolymer, acrylonitrile/butadiene/styrene terpolymer, styrene/-isopropenyl oxazoline copolymer, styrene/maleic acid copolymer, styrene/acrylic acid copolymer and vinyl chloride/vinyl acetate copolymer. Other polymers of interest are listed in U.S. Pat. No. 4,214,020 at Column 10, lines 9-54, and U.S. Pat. No. 4,230,463 at Column 19; lines 47 to Column 20, line 17, both of which are incorporated herein by reference.

The subject invention results in a variety of novel membrane compositions. Some of these membranes represent new compositions unrelated in structure to prior art membranes. Illustrative of novel membrane composition are copolymers formed by condensation polymerization of aryl cyclic sulfonium zwitterions on the surface of a microporous substrate. The resulting polymer is crosslinked when polyfunctional zwitterion is present in the reaction mixture. Copolymers of vinylidene chloride with a permeability enhancing comonomer, such as, isobornyl methacrylate and methacrylic acid, crosslinked with a bisphenol-A sulfonium zwitterion are novel. An epoxy resin modified by reaction with a chloroacetate anion to form a carboxymethylether derivative of the formula.

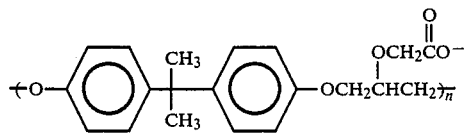

can then be crosslinked by reaction with an epoxy sulfonium derivative, such as,

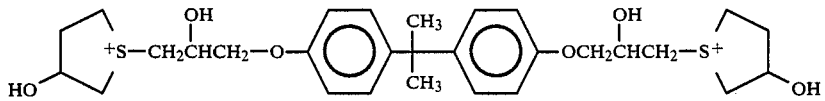

Novel membrane compositions also are produced by modifying membrane forming polymers known in the prior art by incorporation of reactive nucleophilic or cationic groups and subsequent reaction by the methods of this invention to provide a novel, covalently-bonded discriminating layer. For example, poly-2, 6-xylylene oxide is brominated and the bromomethyl groups thus formed are reacted with dimethyl sulfide to form a water-compatible polyelectrolyte consisting of units corresponding to

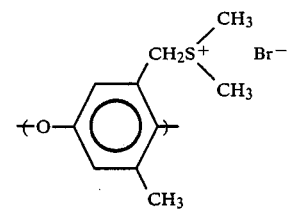

This cationic derivative can be converted to the bicarbonate ion form by ion exchange and crosslinked via reaction with terephthalic acid.

Polysulfone can be chloromethylated and converted to a water-compatible trimethylammonium hydroxide derivative by reaction with trimethyl amine followed by ion exchange. This product is reacted with p,p'-dimercaptodiphenyl to obtain a crosslinked product.

Styrene and acrylonitrile monomers can be polymerized with 20 percent vinyl benzyl chloride by weight. The resulting terpolymer can then be reacted with dimethyl sulfide to prepare the dimethyl sulfonium derivative. The sulfonium product can then be crosslinked by reaction with caryoxy-terminated polybutadiene.

Polymers known in the art to have utility in membranes and bearing nucleophilic or reactive cationic groups can be crosslinked in accordance with the process of this invention with the appropriate reactant. For example, polyethylenimine can be crosslinked with bisphenol-A cyclic sulfonium zwitterion. The amine functional polymers described in U.S. Pat. No. 4,265,745 and 4,360,434, incorporated herein by reference, can also be crosslinked in this manner. Carboxymethyl cellulose can be crosslinked with polyvinylbenzyl dimethyl sulfonium choride. An alkali-soluble phenol formaldehyde resin can be crosslinked with a compound bearing a plurality of azetidinium groups. Hydroxyethylmethacrylate/methacrylic acid copolymer can be crosslinked with a cyclic sulfonium derivative of polyglycidyl methacrylate.

In certain embodiments of this invention, the reactive nucleophilic or cationic compounds are intermixed with non-reactive polymerizable monomers, polymers or other compounds with desired flux and permselectivity. The reactive ionic compound present can then be crosslinked by the methods of this invention to provide novel membranes containing an interpenetrating network, a two-phase structure or other multicomponent polymer alloys, blends or composites.

To further illustrate the subject invention, crosslinking of an aryl cyclic sulfonium moiety is preferably accomplished with almost any water-dispersible compound having an average of at least two free nucleophilic groups, such as for example a carboxyl, amino, substituted amino, amido, substituted amido, phenolic, mercapto, or alkoxide group. Illustrative compounds which the ziwitterion monomers will cross-link are those prepared by addition polymerization such as, for example, a poly-N-vinyl amide, polyvinyl amine, polyacrylate, polymethacrylate, polyarylamide and the like. The methacrylic ester of adducts of nonylphenol and ethylene oxide are partricularly preferred. Coploymers are also operable, e.g., a copolymer of vinylacetate and crotonic acid. Other suitable materials include the polymers prepared by condensation polymerization such as, for example, polyamides, modified polyesters, modified polysulfides and polybenzimidazoles or by ring opening polymerization such as, for example, branched polyethylimine and other polyaziridines and hydrolyzed polyoxazolines. Polymers derived from naturally occurring sources, such as gelatin and modified cellulose, can also be cross-linked to prepare semi-permeable membranes as described herein.

Although not madatory, the nucleophilic compound may be conveniently formed from a copolymer prepared from a monomer having a nucleophilic group capable of reacting or cross-linking with the zwitterion and a hydrophilic monomer for rendering the copolymer compatible in water. Examples of compounds having nucleophilic groups suitable for cross-linking with zwitterion monomer include, but are not limited to, acrylic acid, methacrylic acid, itaconic acid, aminoethyl methacrylate and acrylamide. Water-dispersible monomers which may be used to form the hydrophilic portion of such a copolymer include, but are not limited to, 2-sulfoethyl methacrylate, 2-acrylamido-2-methylpropane-sulfonic acid and 2-hydroxyethyl methacrylate.

In carrying out polymerization, copolymerization or crosslinking of the zwitterion monomer sufficient thermal energy should be applied to remove the water of hydration. Usually a temperature of from about 60° to 160° C. is sufficient to polymerize or cause crosslinking of the monomer. The resulting polymer should be cross-linked to a degree that it is normally solid at the operating conditions employed for separation, but retains the desired permeability. Preferably, the semi-permeable membrane contains at least about 5 weight percent sulfonium zwitterion residue. Of course, relatively greater percentages of zwitterion are generally required to cross-link an oligomer than a polymer.

Zwitterion monomers as herein described are highly sojuble in water. Preferred monomers will readily form aqueous solutions in all proportions. Less water-soluble zwitterions bearing hydrophobic groups can also be used. For preparing membranes according to the present invention forming solutions may be used containing from about 0.2% to about 70% total solids by weight. Suitable solvents for the forming solution may be any solvent in which the zwitterion may be dispersed and as such includes conventional organic solvents in which the zwitterion is soluble or dispersible, so long as these are compatible with the reactants and substrate. Usually such casting solvents are water-miscible.

One preferred nucleophilic prepolymer which may be used in preparing reverse osmosis membranes according to the invention may be represented by the general formula.

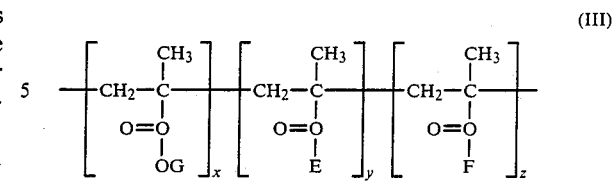

wherein E represents —OCH$_2$CH$_2$SO$_2$ OG or —OCH$_2$CH$_2$OH; G represents H, Na, K, or NH$_4$; F represents —OC$_p$H$_{2p+1}$ or

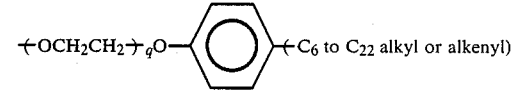

wherein p is an integer from 1 to 12, preferably from 4 to 8, and q is an integer from 1 to 50, preferably from 5 to 20; and x/y/z represents the ratio of the respective repeating units along the polymer chain. Said copolymer may be either a random, graft or a block copolymer or may be a linear or branched copolymer.

Membrane devices of the spiral, tubular hollow fiber or plate and frame configuration can also be fabricated from the novel membranes described herein. These devices are assembled in accordance with conventional techniques once the membrane is prepared. Alternatively, prior art membranes assembled in a device can be treated in place by the methods described hereinbefore.

The following examples will serve to further clairify the invention, but should not be construed as a limitation thereon. All percentages are by weight unless otherwise indicated. The flux and rejection of reverse osmosis membranes were determined at 400 psi (pounds per square inch) using 0.25 percent NaCl solution and 1 percent recovery unless otherwise indicated. The flux and rejection of reverse osmosis membranes were generally measured after sufficient time in operation to attain steady state values. The vinyl benzyl chloride derivatives referred to herein are 60:40 mixtures of meta and para isomers.

EXAMPLE 1

A casting solution containing 1% solids in water was prepared. The monomers and prepolymers present were poly-2-sulfoethyl methacrylate-co-methacrylic acid, 50 percent; p-bisphenol A zwitterion monomer, 25 percent; and o-cresol zwitterion monomer, 25 percent. For clarity, the structure of poly-2-sulfoethyl methacrylate co-methacrylic acid may be represented by formula III hereinbefore wherein E represents —OCH$_2$CH$_2$SO$_2$ONa, G represents H and the ratio of x:y:z is 0.1:0.9:0. This copolymer consists of 90 percent by weight of 2-sulfoethyl methacrylate (Na+ salt) and 10% by weight was methacrylic acid. p-Bisphenol A zwitterion is represented by formula II hereinbefore, wherein Z is —C(CH$_3$)$_2$— m is zero, k is 1, and wherein attachment of the sulfonium moiety is ortho to the phenolic oxygen and meta to attachment of the bridge. o-Cresol zwitterion is represented by formula I wherein n is 1, k is 1, R is ortho mehtyl in relation to the phenolic oxygen and the sulfonium moiety is para to the phenolic oxygen.

The casting solution was cast upon a polyfulfone supporting membrane that has been previously washed with deionized water. The water solvent was removed from the casting solution and polymerization was effected by curing the membrane for 30 minutes at 110° C.

Measurement of the permeation properties of this membrane showed an 88.5% salt rejection and an 11.0 GFD (gal/sq. ft./day) permeation rate on a 0.25% sodium chloride solution at 600 psi.

EXAMPLE 2

A polyethyleneimine (PEI) coating solution containing 2% solids was preprared by adding 12.95 g. of a 4% aqueous solution of branched PEI and 1.72 g of a p-bisphemol A zwitterion monomer solution (28.17% solids in water) into 35.33 g. of distilled water containing the surfactant (FC-134, a cationic perfluorinated surfactant available from 3M Company under the name FLUORORAD ®). The ratio of PEI to p-bisphenol A zwitterion monomer in this solution was about 52 to 48 percent by weight or 10 moles of PEI repeating units to 1 mole of zwitterion monomer. Based on total solids, the surfactant content was about 0.1 percent by weight. The resulting solution was filtered through a 0.45 micron MILLIPORE HA-type filter.

A composite membrane was prepared using an 0.01 micron pore MILLIPORE VF-type filter as the support layer. The filter was allowed to soak in the solution prepared above for about two hours under reduced pressure. After removal from the solution, the filter was drained and placed on a clean glass plate. Additional coating solution (0.3 ml) was applied to the filter. The coated membrane was dried and cured in an air oven at 90–100° C. for 35 minutes. The resulting composite membrane was stored in deionized water. Examination of the membrane using an electron microscope indicated the discriminating layer consisted of a 0.35 micron coating with some penetration of the coating material into the pores of the supporting layer.

Measurement of the permeation properties of the above membrane showed a 99.4 percent salt rejection and 0.95 GFD (gal/sq. ft./day) permeation on a 0.25 percent sodium chloride solution at 600 psig. At 710 psig, 98.4 percent salt refection and 0.85 GFD was observed using a 1.75 percent sodium chloride solution.

EXAMPLES 3–7

Other membranes were prepared using essentially the same procedures as given in Example 2 above, except the ratio of the polymer and zwitterion were varied and other materials were used to form the support layer of the composite membrane. Permeation studies were conducted using 0.25 percent sodium chloride solution at room temperature and neutral pH. Measurements were made in a cell having either a 7.07 cm$^2$ effective membrane area or a 39.2 cm$^2$ effective membrane area. The results are shown in Table I.

TABLE 1

| Example Number | Composition of Coating Solution (wt. %) | | | | Desalination Performance | |
|---|---|---|---|---|---|---|
| | PEI | p-bisphenol A Zwitterion | Surfactant | Type of Porous Support | Water Flux* | Salt Rejection (%) |
| 3 | 52 | 48 | — | Polysulfone | 1.9 | 98.6 |
| 4 | 44 | 56 | 0.1 | PELLICON PTHK | 0.2 | 99.8 |
| 5 | 55 | 45 | 0.1 | " | 1.0 | 99.7 |
| 6 | 72 | 28 | 0.1 | " | 3.5 | 98.2 |
| 7 | 55 | 45 | 0.1 | MILLIPORE VS | 0.6 | 99.7 |

*GFD at 600 PSI.

EXAMPLES 8–12

Membranes were prepared in a manner similar to thet described in Example 2 above except that the propolymer in the coating solution was a copolymer of 2-sulfoethyl methacrylate (Na+ salt) and methacrylic acid, 90/10 by weight with $M_n = 149,000$. The copolymer solution was 10.6 percent solids in water, pH 5.2. The monofunctional zwitterion, o-cresol zwitterion, was also used in several coating solutions. All coating solutions contained 0.1 percent (solid) surfactants (FC-128, a perfluorinated anionic surfactant available from 3M Company sold under the name FLUORORAD ®). The specific results are shown in Table II.

TABLE II

| Example Number | Composition of Coating Solution (wt. %) | | | | Desalination Performance | |
|---|---|---|---|---|---|---|
| | Prepolymer | p-bisphenol A Zwitterion | o-cresol Zwitterion | Type of Porous Support | Water Flux* | Salt Rejection (%) |
| 8 | 40 | 24 | 36 | Polysulfone | 1.7 | 97.5 |
| 9 | 40 | 24 | 36 | " | 1.7 | 96.2 |
| 10 | 40 | 24 | 36 | MILLIPORE VS | 21.3 | 63.6 |
| 11 | 40 | 24 | 36 | MILLIPORE VF | 4.8 | 84.2 |
| 12 | 56 | 44 | — | Polysulfone | 1.3 | 98.5 |

*GFD at 600 PSI.

EXAMPLE 13

Using the same procedures given above a composite membrane was prepared using a PELLICON PTHK support layer coated with 20 percent aqueous solution, the solids containing 32 percent by weight of a copolymer of 2-sulfoethyl methacrylate (Na+ salt) and methacrylic acid, 85 to 15 by wt. with an $M_n$ of 129,000, and 32 percent by weight o-cresol zwitterion monomer and 36 percent by weight o-cresol zwitterion monomer and 36 percent weight 1, 1'-((1-methylethylidenebis-(6-hydroxy-3, 1-phenylene))bis(3-hydroxy tetrahydrothiophenium hydroxide)bis(inner salt). The casting solution also contained 0.1 percent FC-128 surfactant and total solids equalled 2 percent by weight. Water flux was measured as 0.5 (GFD @ 600 psi), and salt rejection was found to be 89.2 percent.

EXAMPLE 14

A composite membrane was prepared using a MILLIPORE VF filter as the support layer. The discriminating layer was cast from an aqueous coating mixture (2 percent total solids) containing 80 percent of a copolymer of 2-hydroxyethyl methacrylate and methacrylic acid, 90/10 by wt. with $M_n$=21,700, 20 percent p-bisphenol A switterion, and 0.2 percent FC-134 surfactant. This membrane had a water flux of 0.8 (GFD @ 600 psi) and a salt rejection of 96.7 percent.

EXAMPLE 15

A composite membrane was prepared using a PELLICON PTHK filter as the support layer. The discriminating layer was cast from an aqueous coating mixture (2 percent total solids) containing 77 percent polyacrylic acid, 23 percent p-bisphenol A zwitterion, and 0.1 percent surfactant. This membrane had a water flux of 0.4 (GFD @ 600 psi) and a salt rejection of 94.8 percent.

EXAMPLE 16

In a similar manner, a composite membrane was prepared by coating a polysulfone support membrane with a casting solution (1 percent solids) containing 70 percent polyacrylamide, 30 percent p-bisphenol A zwitterion, and 0.2 percent surfactant. Water flux for this membrane was found to be 0.6 (GFD @ 600 psi) and salt rejection was 71.4 percent.

EXAMPLE 17

Using a polysulfone membrane as the support layer, a composite membrane was prepared form an aqueous casting solution (1 percent total solids) containing 80 percent polyethyloxazoline (46 percent hydrolyzed), 20 percent p-bisphenol A zwitterion monomer, and 0.25 percent surfactant. This membrane had a water flux of 4.3 and a salt rejection of 36.2 percent.

EXAMPLE 18

In the same manner as Example 17 a composite membrane was prepared except the aqueous casting solution contained 30 percent polyacrylamido methyl propane sulfonic acid sodium salt, 70 percent p-bisphenol A zwitterion monomer, and 0.5 percent surfactant. Water flux was 0.3 (GFD @ psi) and salt rejection was 54 percent. EXAMPLES 19-22

Membranes were prepared as above except only zwitterion or an admixture of zwitterion monomers were the major film-forming components in the casting solution. Details of the membrane preparations and their desalination performance are shown in Table III.

TABLE III

| Example Number | Composition of Coating Solution (wt. %) | | | | | Solid Content | Desalination Performance | |
|---|---|---|---|---|---|---|---|---|
| | OCZ[1] | HEPZ[2] | PBAZ[3] | HTBA[4] | Surfactant | | Water Flux[5] | Salt Rejection (%) |
| 19 | 60 | | 40 | | 0.1 | 1 | 0.04 | 64.9 |
| 20 | | | | 100 | 0.2 | 3 | 0.1 | 28.5 |
| 21 | | 100 | | | 0.2 | 3 | 0.6 | 10 |
| 22 | | 83 | | 17 | 0.2 | 3 | 0.15 | 33 |

[1]OCZ = o-cresol zwitterion.
[2]HEPZ = o-hydroxyethoxy phenol zwitterion.
[3]PBAZ = p-bisphenol A zwitterion.
[4]HTBA = 1,1'-((1-methylethylidene bis(6-hydroxy-3,1-phenylene)bis(3-hydroxytetrahydrothiophenium hydroxide) bis (inner salt).
[5]GFD at 600 psi.

EXAMPLE 23

A composite membrane was prepared using a PELLICON PTHK filter as the support layer. The discriminating layer was cast from a coating mixture (2% total solids) containing 54 percent terpolymer of methacrylic acid, 2-sulfoethyl methacrylate and methyl methacrylate (in 15/55/30 by wt.), 18 percent O-cresol zwitterion, 28 percent p-bisphenol A zwitterion and 0.5 percent surfactant. This membrane had a water flux of 1.5 (GFD @ 600 psi) and a salt rejection of 96.6 percent.

EXAMPLE 24

Three membranes prepared in a similar manner to the membrane described in Example 14 were tested for chlorine and pH stability. Membranes II and III used a cellulosic support layer and Membrane I used a polysulfone support layer. The results are shown in Table IV below.

TABLE IV

| Test Conditions | Membrane I | | Membrane II | | Membrane III | |
|---|---|---|---|---|---|---|
| | Water Flux* | Salt Rejection (%) | Water Flux* | Salt Rejection (%) | Water Flux* | Salt Rejection (%) |
| (1) After 70 hours | 0.27 | 89.6 | 0.45 | 96.8 | 0.45 | 94.3 |
| (2) 3-5 ppm Cl pH 6-7 After 90 hours | 0.23 | 86.2 | 0.45 | 97.4 | 0.46 | 94.3 |
| (3) pH 11.9 After 26 hours | 0.29 | 82.8 | 1.5 | 91.5 | 1.5 | 90.2 |
| (4) After 24 hours | 0.30 | 88.7 | 1.7 | 96.9 | 1.7 | 96.7 |

*GFD at 600 PSI.

No damage to the discriminating layer was observed as a result of exposure to the chlorine or pH extremes. Some damage to the cellulose support layer of Membranes II and III were observed at pH 11.9 which accounts for the increase in flux at the higher pH. Membrane I used a polysulfone support layer and it will be noted no increase in flux was observed at pH 11.9. EXAMPLE 25

A zwitterion crosslinked polyethyleneimine composite membrane prepared as described for Example 7 was used for the separation of gases. The permeabilities of four single gases, including $N_2$, $O_2$, $CH_4$ and $CO_2$, were measured separately through the membrane, and their relative permeabilities were caculated. The results are shown in Table V at three different humidities.

TABLE V (Flow Rate of Feed Gas = 5-20 cc/sec)
Measured at Room Temperature

| Humidity Contents In Feed Gases | Applied Pressure (psi) | Gas Permeability (cc(std)/cm$^2$/sec/psi) | | | | Relative Permeability | | | | $CO_2/CH_4$ |
|---|---|---|---|---|---|---|---|---|---|---|
| | | $O_2$ | $N_2$ | $CH_4$ | $CO_2$ | $O_2$ | $N_2$ | $CH_4$ | $CO_2$ | |
| For Membrane (Desalting Ability: 98.4% Rejection; 0.8 GFD @ 600 psi) | | | | | | | | | | |
| (1) Dry[1] | 100 | $3.83 \times 10^{-6}$ | $4.64 \times 10^{-6}$ | $6.74 \times 10^{-6}$ | $4.93 \times 10^{-6}$ | 1 | 1.2 | 1.8 | 1.3 | 0.73 |
| | 150 | $4.41 \times 10^{-6}$ | $5.28 \times 10^{-6}$ | $8.05 \times 10^{-6}$ | $5.39 \times 10^{-6}$ | 1 | 1.2 | 1.8 | 1.2 | 0.67 |
| | 200 | $4.96 \times 10^{-6}$ | $6.17 \times 10^{-6}$ | $8.92 \times 10^{-6}$ | $6.31 \times 10^{-6}$ | 1 | 1.2 | 1.8 | 1.3 | 0.71 |
| (2) 93% RH[1] | 100 | $3.67 \times 10^{-6}$ | $1.34 \times 10^{-6}$ | $5.06 \times 10^{-6}$ | $1.72 \times 10^{-5}$ | 1 | 0.37 | 1.4 | 4.7 | 3.4 |
| | 150 | $4.26 \times 10^{-6}$ | $3.83 \times 10^{-6}$ | $6.09 \times 10^{-6}$ | $1.75 \times 10^{-5}$ | 1 | 0.90 | 1.4 | 4.1 | 2.9 |
| | 200 | $4.85 \times 10^{-6}$ | $4.71 \times 10^{-6}$ | $7.18 \times 10^{-6}$ | $1.64 \times 10^{-5}$ | 1 | 0.07 | 1.5 | 3.4 | 2.3 |
| (3) 100% RH[2] | 100 | $2.63 \times 10^{-7}$ | $1.0 \times 10^{-7}$ | $2.02 \times 10^{-7}$ | $4.02 \times 10^{-6}$ | 1 | 0.38 | 0.77 | 15. | 20. |
| | 150 | $2.38 \times 10^{-7}$ | $1.13 \times 10^{-7}$ | $2.10 \times 10^{-7}$ | $5.20 \times 10^{-6}$ | 1 | 0.47 | 0.88 | 22. | 25. |
| | 200 | $2.72 \times 10^{-7}$ | $1.23 \times 10^{-7}$ | $1.75 \times 10^{-7}$ | $6.31 \times 10^{-6}$ | 1 | 0.45 | 0.64 | 23. | 36. |

NOTES:
[1] Membrane was dried (25–35° C., high vacuum; 48 hours) before conducting measurements with dry feed gases and 93% relative humidity feed gases formed by feed gases through a saturated $Na_2SO_4$ solution.
[2] Membrane was flooded with D.I. water at low pressure (20 psi) prior to gas permeation measurement. Feed gases were bubbled through D.I. water before entering test cell.

EXAMPLE 26

A 25 g. membrane casting solution containing 10 percent solids was formulated by mixing 22.37 g. of a poly-2-hydroxyethyl methacrylate-co-methacrylic acid (90/10 by wt.) stock solution (8.9 percent solids in water), 1.81 g. of a p-Bisphenol A zwitterion stock solution (28.1 percent solids in water) and three different perfluorinated surfactants, (all FLUORORAD ® surfactants from 3M Company). The amount of each 1% surfactant stock solution added was 0.375 g. for FC-128, 0.25 g. for FC-171 and 0.375 g. for FC-430. The ratio of polymer to zwitterion in this solution was 79.6 to 20.4 by weight or 1 to 1.1 by equivalent weight based on active functional groups. This solution was thoroughly mixed and filtered through a MILLIPORE HA-type filter with 0.45 pores and finally deaerated under a reduced pressure before uses.

Six ml of the above solution was transferred onto a silane treated glass and spread over 167 cm$^2$ of effective membrane area. The silane coating was formed by one 5 second soak in silane agent solution (0.3 percent solids, in 10 percent isopropanol aqueous solution) and 2 hours of air drying at room temperature followed by 10 minutes heating in an air oven at 100° C. The silane-treated glass plate was then framed with two layers of masking tape to form a shallow trough to contain the membrane solution.

Water in the membrane solution was allowed to evaporate slowly at room temperature overnight and then further removed by drying the glass plate supported membrane in a vacuum oven at 25°–35° C. for 7 days. Finally, the membrane was insolubilized by curing in an air oven at 90° C. for 20 minutes, then at 120° C. for 40 minutes.

The insolubilized zwitterion membrane was removed from the glass plate by a sequential swelling treatment:
(1) overnight in 3.5 percent NaCl solution;
(2) 24 hours in D.I. water;
(3) 24 hours in $10^{-2}$M $NH_4OH$ solution.

The membrane was then washed with a large amount of D.I. water and finally soaked in a diluted pH 7 buffer solution.

This membrane exhibited a 94.2 percent salt rejection to a 0.25 percent NaCl solution and a 0.1 GFD of water flux under 600 psi applied pressure.

EXAMPLE 27

A 35 g. coating solution containing 2% solids was formulated by adding 0.344 g. of a branched polyethylenimine dry sample and 1.202 g. of a p-Bisphenol A zwitterion stock solution (29.6 percent solids in n-butanol), together with 33.45 g. of n-butanol (reagent grade). The water contents in the p-Bisphenol A zwitterion stock solution and the formulated coating solution measured by Fisher titration were 0.077 and 0.613 percent by weight, respectively. This coating solution was filtered through a double layered, MILLIPORE LS-type TEFLON filter.

A PELLICON PTHK-type ultrafilter was selected as a porous substrate for making a composite membrane from the filtered coating solution.

The resulting membrane exhibited a 93.2 percent salt rejection to a 0.25 percent sodium chloride solution and a water flux of 5.8 GFD at 600 psi applied pressure.

EXAMPLE 28

A terpolymer prepared by the addition polymerization of 80 parts 2-hydroxyethyl methacrylate, 10 parts methacrylic acid and 10 parts of a methacrylate ester of an adduct of nonylphenol and a polyethylene glycol containing 10 equivalents of ethylene oxide was employed as a component of a membrane casting solution. All parts and percentages are by weight. This casting solution contained 2 percent solids consisting of 78.2 percent of the terpolymer, 21.8 percent of a p-Bisphenol zwitterion and 0.3 percent of a perfluorinated surfactant (sold under the trademark FC-128 by 3M Company) and 98 percent water.

A PELLICON PTHK filter was coated with an excess of the membrane casting solution, drained rapidly and then heated with a heating lamp until ostensibly dry. The filter was then cured in air at 120° C. for 40 minutes.

The resulting composite membrane exhibited 98.4 percent salt rejection and 0.07 GFD water flux when subjected to a 0.25 percent aqueous NaCl solution at 600 psi applied pressure.

EXAMPLE 29

A polyvinyl acetate/crotonic acid copolymer sold by Monsanto under the tradename Gelva (Grade C-5V-16M) was employed as a component in a membrane casting solution. The copolymer was used in the ammonium salt form in a 10 weight percent solids solution in water having a pH of 9.3. To 8.52 grams of the copolymer solution was added 0.528 gram of a p-Bisphenol A zwitterion monomeric aqueous solution containing 28.1 percent solids, 0.3 gram of 1 weight percent of a perfluorinated surfactant in a 10 weight percent isopropanol, 90 weight percent water solution (under the trademark FC-128 sold by 3M Company) and sufficient deionized water to make a solution totalling 50 grams. In this solution there is approximately 1.5 equivalents of zwitterion monomer for each equivalent of carboxylic acid present.

The casting solution was filtered and then a PELLICON PTHK filter was soaked in the solution for 2 hours. The filter was drained for 30 seconds while held in a vertical orientation and then 0.1 milliliter of additional casting solution was distributed uniformly over the filter. The filter was dried in air for 2 hours at 20° C. and then cured at 115° C. for 45 minutes.

The resulting composite membrane exhibited 99.4 percent salt rejection and 0.05 GFD water flux at 40° C. when contacted with a 0.24 weight percent aqueous NaCl solution at 600 psi applied pressure.

EXAMPLE 30

A membrane casting solution containing 3 weight percent solids consisting of 22.5 weight percent of dimethyl malonic acid in ammonium salt form and 77.5 weight percent p-Bisphenol A zwitterion monomer and 0.5 weight percent of a surfactant (sold under the tradename Triton X-100) was liberally coated on a PELLICON PTHK filter. The filter was drained briefly, placed in a framing support and dried in a microwave for 3 minutes. The filter was then cured in air at 125° C. for 30 minutes.

The resulting composite membrane exhibited 87.6 percent salt rejection and 0.005 GFD water flux at 40° C. when contacted with a 0.25 weight percent aqueous NaCl solution at 600 psi.

EXAMPLE 31-59

Comparative Examples 1-27

Composite membranes were prepared using a Millipore VSWP-type filter as a support layer. The filter was secured at a top edge and disposed so the top side makes about a 135° angle from horizontal. An aqueous solution of an anionic polymer at a solids concentration of 2 weight percent was applied uniformly to the top of the filter and allowed to flow so as to wet the filter surface uniformly. The coating solution also contained 0.2 weight percent of a perfluorinated surfactant (FC-128) and from 7 to 20 percent of a zwitterion corresponding to Structure 1 in Table VI as a crosslinker.

The anionic polymer present was selected from: (1) Polymer A, a vinyl addition terpolymer of 2-hydroxyethyl methacrylate (HEMA), methacrylic acid (MAA) present as an ammonium salt and p-nonylphenoxynonaethoxy ethyl methacrylate (9N-10MA), said monomers present in a weight ratio of 80/10/10 for HEMA/MAA/9N-10MA; and (2) Polymer B, a vinyl addition copolymer of HEMA and

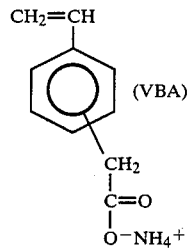

(VBA) in a ratio of 80/20 by weight.

After the aqueous anionic polymer had contacted the filter for ten seconds, the excess solution was removed by blotting the filter at the lower edge with absorbent paper. The coating was then cured at 85° C. for 15 minutes. The filter was rotated 180° C. in the same plane. The anionic coated filter was then coated a second time in the same manner except a 1 percent solids anionic polymer solution was employed. In Examples 58 and 59 and Comparative Experiments 26 and 27 a 0.5 percent solids solution was used. The coated filter was then cured at 85° C. for 15 minutes, except in Example 33 which was cured at 100° C. for 15 minutes.

The coated filters were immersed in deionized water for about 2 to 6 hours. The coated filters were removed and washed with a solution of a reactive cationic material followed immediately by a water wash. The identity of the cationic material is tabulated in Table VI, while its concentration and the cure conditions are tabulated in Table VII.

In general, two coated filters were immersed in water and heated in a manner similar to those contacted with the reactive cationic material, but are not treated with the cationic material. These filters were used as controls in comparative experiments.

Both the control filters and filters coated with an anionic base coat and cationic wash were immersed in water for about 2 to 12 hours and cut to fit a reverse osmosis test cell. The salt rejection and water flux was determined using a 0.25 percent NaCl solution at 400 psi with a flow rate of 55 to 65 milliliters per minute. The coating parameters, including the cation structure from Table VI, the cation concentration in weight percent, cure temperature in ° C. and cure time in minutes for cationic coating and the identity of the anionic polymer and percent zwitterion present in the anionic coating and test results are tabulated in Table VII.

TABLE VI

| Structure No. | Reactive Cationic Material |
|---|---|
| 1 | [Bisphenol A derivative with two tetrahydrothiophenium substituents on the aromatic rings, with O⁻ groups] |
| 2 | HCO₃⁻ ⁺S(tetrahydrothiophenium)—C₆H₄—O—C₆H₄—S⁺(tetrahydrothiophenium) HCO₃⁻ |
| 3 | Copolymer structure: $+(CH_2\text{-}C(CH_3)(COOCH_3))_a\text{-}(CH_2\text{-}CH(Ar_1))_b\text{-}(CH_2\text{-}CH(Ar_2))_c\text{-}(CH_2\text{-}CH(Ar_3))_d+_n$ where Ar₁ = C₆H₄-CH₂-S⁺(CH₃)₂ Cl⁻, Ar₂ = C₆H₄-CH₂-N⁺(CH₃)₂(CH₂CH₂-O-CO-C(CH₃)=CH₂) Cl⁻, Ar₃ = C₆H₄-CH₂-N⁺(CH₃)₂(C₁₂H₂₅) Cl⁻; mole ratio of a:b:c:d = 0.755:0.160:0.053:0.032 |
| 4 | POLYCUP ® 172 from Hercules, Incorporated, i.e., a polymer including units of the formula $+(NH\text{-}CH_2CH_2\text{-}\overset{+}{N}\text{-}CH_2CH_2NH)+$ with cyclic substituent (azetidinium) bearing OH, HCO₃⁻ |
| 5 | 2HCO₃⁻    (CH₃)₂⁺S—CH₂CH=CH—CH₂—S⁺(CH₃)₂ |
| 6 | Polymer from 1:1:1 mole ratio of butadiene; methyl methacrylate and H₂C=CH-C₆H₄-CH₂-O-C₆H₃(CH₃)-S⁺(tetrahydrothiophenium) HCO₃⁻ |
| 7 | HCO₃⁻ (H₅C₂)₂⁺S-CH₂-C₆H₂(CH₃)₂-CH₂-S⁺(C₂H₅)₂ HCO₃⁻ |

TABLE VI-continued

| Structure No. | Reactive Cationic Material |
|---|---|
| 8 | 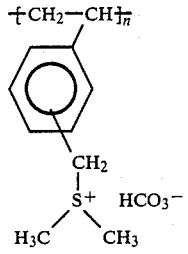 |
| 9 | 60/30/10 weight percent ratio of terpolymer of HEMA/VBDMS$^+$ HCO$_3^-$/9N—10MA, wherein VBDMS$^+$HCO$_3^-$ is 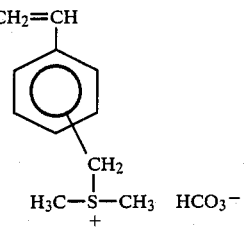 |
| 10 | 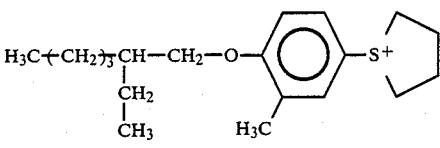 |
| 11 | 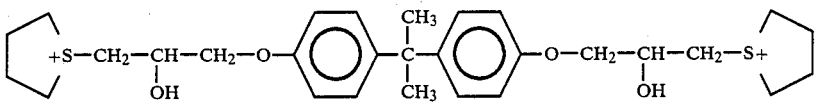 |
| 12 | 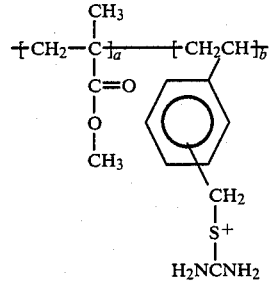 70:30 mole ratio of methyl methacrylate to isothiouronium. |

TABLE VII

| Ex. | Comp Exp | Cation Structure | Cationic Concentration | Cure Temp. (°C.)/ Time (min) | Anionic Polymer/ % Zwitterion | Percent Rejection | Flux (GFD) |
|---|---|---|---|---|---|---|---|
| 31 | — | 1 | 0.1 | 85°/15 | A/7 | 86.78 | 0.847 |
| 32 | — | " | " | " | " | 88.49 | 0.677 |
| — | 1 | — | 0 | — | " | 77.97 | 1.12 |
| — | 2 | — | " | — | " | 78.08 | 1.25 |
| 33 | — | 1 | 0.1 | 114°/45 | A/15 | 97.26 | 0.564 |
| — | 3 | — | 0 | — | " | 95.3 | 0.682 |
| — | 4 | — | " | — | " | 95.8 | 0.682 |
| 34 | — | 2 | 0.2 | 85°/60 | A/7 | 83.4 | 1.29 |
| 35 | — | " | " | " | " | 81.95 | 1.37 |
| — | 5 | — | 0 | — | " | 71.1 | 2.25 |
| — | 6 | — | " | — | " | 72.9 | 2.24 |
| 36 | — | 2 | 0.1 | 85°/60 | A/7 | 94.4 | 0.54 |
| 37 | — | " | " | " | " | 89.1 | 0.57 |
| — | 7 | — | 0 | — | " | 73.4 | 2.8 |
| — | 8 | — | " | — | " | 59.7 | 1.15 |
| 38 | — | 3 | 0.2 | 85°/60 | A/7 | 67.9 | 1.97 |
| 39 | — | " | " | " | " | 65.9 | 2.05 |
| — | 9 | — | 0 | — | " | 58.51 | 3.7 |

TABLE VII-continued

| Ex. | Comp Exp | Cation Structure | Cationic Concentration | Cure Temp. (°C.)/Time (min) | Anionic Polymer/% Zwitterion | Percent Rejection | Flux (GFD) |
|---|---|---|---|---|---|---|---|
| — | 10 | — | " | — | " | 60.86 | 4.8 |
| 40 | — | 3 | 0.2 | 85°/240 | A/7 | 75.0 | 1.76 |
| 41 | — | " | " | " | " | 77.0 | 1.65 |
| — | 11 | — | 0 | — | " | 69.63 | 2.25 |
| — | 12 | — | " | — | " | 71.48 | 2.60 |
| 42 | — | 4 | 0.2 | 85°/90 | A/7 | 89.9 | 0.84 |
| 43 | — | " | " | " | " | 91.36 | 0.71 |
| — | 12 | — | 0 | — | " | 69.3 | 2.92 |
| — | 13 | — | " | — | " | 69.7 | 3.09 |
| 44 | — | 4 | 0.02 | 85°/120 | A/7 | 73.4 | 2.23 |
| 45 | — | " | " | " | " | 78.5 | 1.68 |
| — | 14 | — | 0 | — | " | 72.9 | 2.17 |
| — | 15 | — | " | — | " | 73.18 | 2.74 |
| 46 | — | 5 | 0.2 | 85°/120 | A/7 | 75.4 | 2.30 |
| 47 | — | " | " | " | " | 71.9 | 2.44 |
| — | 16 | — | 0 | — | " | 73.18 | 2.17 |
| — | 17 | — | " | — | " | 72.9 | 2.74 |
| 48 | — | 6 | 0.2 | 85°/120 | B/20 | 84.2 | 1.29 |
| 49 | — | " | " | " | " | 85.1 | 1.28 |
| — | 18 | — | 0 | — | " | 71.5 | 2.25 |
| 50 | — | 7 | 0.2 | 85°/120 | B/20 | 84.7 | 1.34 |
| 51 | — | " | " | " | " | 92.4 | 0.82 |
| 52 | — | 8 | 0.2 | 85°/120 | B/20 | 76.43 | 2.41 |
| 53 | — | " | " | " | " | 78.97 | 1.83 |
| — | 20 | — | — | — | " | 71.55 | 3.09 |
| — | 21 | — | — | — | " | 73.79 | 2.88 |
| 54 | — | 9 | 0.2 | 85°/120 | B/20 | 73.53 | 1.66 |
| 55 | — | " | " | " | " | 75.2 | 1.56 |
| — | 22 | — | — | — | " | 70.16 | 2.01 |
| — | 23 | — | — | — | " | 68.18 | 2.5 |
| 56 | — | 10 | 0.2 | 85°/120 | B/7 | 89.84 | 0.834 |
| 57 | — | " | " | " | " | 86.55 | 1.097 |
| — | 24 | — | — | — | " | 73.85 | 2.6 |
| — | 25 | — | — | — | " | 73.42 | 2.5 |
| 58 | — | " | 0.2 | 85°/120 | A/7 | 82.25 | 1.13 |
| 59 | — | " | " | " | " | 83.11 | 1.06 |
| — | 26 | — | — | — | " | 68.5 | 2.24 |
| — | 27 | — | — | — | " | 74.6 | 2.54 |
| 122 | — | 12 | 0.2 | 85°/120 | A/7 | 73.41 | 2.22 |
| 123 | — | " | " | " | " | 78.5 | 1.68 |
| — | 32 | — | — | " | " | 72.9 | 2.17 |
| — | 33 | — | — | " | " | 73.18 | 2.74 |

EXAMPLES 60-61

Comparative Experiments 28-29

Four filters were coated with a 2 weight percent aqueous anionic polymer solution in the general manner of Example 31. Thhe anionic polymer was 93 weight percent Polymer B as in Example 56 and included 7 weight percent of the zwitterion of Structure 1 in Table 6. The anionic coating solution also included 0.2 weight percent FC-134 surfactant on a solids basis. After curing the first coat at 85° C. for 15 minutes the coating process was repeated using a 1 weight percent solution. The coated filters were then immersed in water for 2 hours.

A 0.5 percent aqueous solution of

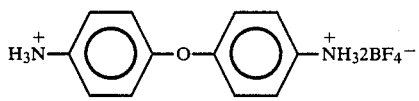

was cooled to 0° C. An equivalent amount of 0.2 normal solution of $NaNO_2$ at 0° C. was added. Two of the coated filters were immediately washed with the freshly prepared diazonium solution. The washed filters after 3 minutes were washed with water and cured at 85° C. for 1 hour.

The treated filters and two controls were tested for salt rejection and flux as in Example 31. The results are tabulated in Table VIII. It is believed that some decomposition of the diazonium between the first and second filters treated accounts for the lower rejection obtained with the second sample.

TABLE VIII

| Example | Comparative Experiment | Flux (GFD) | Rejection (%) |
|---|---|---|---|
| 60 | — | 1.32 | 85.04 |
| 61 | — | 1.91 | 77.04 |
| — | 28 | 2.68 | 70.97 |
| — | 29 | 2.04 | 76.78 |

EXAMPLES 62-67

Twenty grams of a 2 weight percent aqueous solution of a cationic reactant were mixed with twenty grams of a 2 weight percent aqueous solution of a vinyl addition polymer prepared from methyl methacrylate and

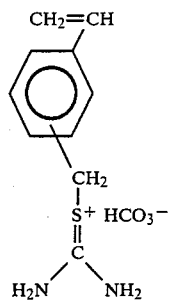

in a mole ratio of 70:30. To the aqueous mixture was added 0.2 percent on a solids basis FC-134 surfactant. The resulting solution was used to coat two filters in the manner of Example 31 and the coating cured at 85° C. for 2 hours. The identity of the cationic reactant and flux and salt rejection when tested as in Example 31 are tabulated in Table IX.

TABLE IX

| Example | Cationic Reactant | Flux (GFD) | Rejection (%) |
|---|---|---|---|
| 62 | Polymer from following monomers in weight ratio of 60% HEMA, 30% $H_2C{=}CH$-phenyl-$CH_2$-$N^+(CH_3)_3$ $HCO_3^-$ and 10% 9N—10MA | 3.15 | 85.66 |
| 63 | Same as in Example 62. | 3.53 | 85.09 |
| 64 | Polymer from following monomer in weight ratio of 60% HEMA 30% $H_2C{=}CH$-phenyl-$CH_2$-N$^+$(pyridinium) $HCO_3^-$ and 10% 9N—10MA | 1.31 | 91.81 |
| 65 | Same as in Example 64. | 1.21 | 91.70 |
| 66 | Polymer from following monomers in weight ratio of 60% HEMA, 30% $CH_2{=}CH$-phenyl-$CH_2$-$\overset{+}{S}(CH_3)_2$ $HCO_3^-$ and 10% 9N—10MA | 0.094 | 94.46 |
| 67 | Same as in Example 66. | 0.104 | 98.70 |

EXAMPLE 68

A vinyl addition polymer was prepared by reaction of HEMA, vinylbenzyl dimethyl sulfonium chloride (VBDMS$^+$Cl$^-$) and 9N-10MA in a weight ratio of 70/20/10. The VBDMS$^+$Cl$^-$ was prepared by reaction of vinyl benzyl chloride with dimethyl sulfide at 35° C. in aqueous methanol. The vinyl addition polymer was prepared by reaction of the monomers in aqueous t-butanol in the presence of t-butyl hydroperoxide and sodium formaldehyde hydrosulfite at 50° C.

The sulfonium salt was converted to the hydroxide form by means of an ion exchange resin. An aqueous solution of the polymer (2 percent by weight) was prepared and 0.2 percent by weight solids of FC-134 surfactant was added. To 44.2 grams of this solution were added 0.094 grams of bisphenol A in 5 grams of methanol. The resulting solution was used to coat two filters in the manner of Example 31. The coated filters were cured at 85° C. for 1.5 hours.

The coated filters when tested in accordance with the method in Example 31 exhibited rejections of 96.58 percent and 97.79 percent and fluxes of 0.468 GFD for both samples.

EXAMPLE 69-71

A microporous Millipore VSWP filter (a mixed cellulose ester of acetate and nitrate) was sealed between two gaskets with reservoirs on each side of the filler. The filter was then treated on one side with a 2 percent aqueous solution of the cationic material corresponding to Structure 4 in Table VI and on the opposite side with a 2 percent aqueous solution of Polymer A in Example 31. The two solutions flowed into the respective reservoirs at equal rates. Three filters were so treated; one for 4 hours, one for 2 hours and one for 10 minutes. The filters were then soaked in water for 48 hours and cured at 85° C. for 2 hours. The salt rejections and fluxes were determined and are tabulated in Table X.

TABLE X

| Example | Coating Time | Flux (GFD) | Rejection (%) |
|---|---|---|---|
| 69 | 4 hours | 0.392 | 82.11 |
| 70 | 2 hours | 0.281 | 88.51 |
| 71 | 10 minutes | 0.575 | 82.16 |

EXAMPLE 72

Eight grams of a polymer corresponding to Structure No. 9 in Table VI was added to aqueous tetrahydrofuran and sparged with nitrogen. Four milliliters of tri-n-butyl phosphine was added with stirring and the mixture heated to 55° C. for 1 hour, 75° C. for 1.75 hours followed by 50° C. for 16 hours. The resulting solution was evaporated to remove tetrahydrofuran, dialyzed and filtered. It was determined that phosphorus has displaced 34 percent of the sulfur initially present.

To 18 grams of a 0.2 percent solution of the phosphorus bearing polymer was added 0.286 grams of a 10 percent solution of the thiouronium polymer in Example 62 and 0.2 percent on a solids basis FC-128 surfactant. Two microporous polysulfone filters were coated with the resulting solution and cured at 85° C. for 150 minutes. The flux and rejection of the filters measured after 121 hours of operation were 98.25 percent at 0.233 GFD and 99.39 percent at 0.196 GFD, respectively.

EXAMPLE 73

To a reaction vessel was charged 305.2 grams (2 moles) of vinyl benzyl chloride, 430 grams of methanol, 248.6 grams (4 moles) of dimethyl sulfide and 1000 milliliters (ml) of deionized water. The resulting mixture was heated at 35° C. for one hour with stirring. To the resulting mixture was added 375 ml of water over a 30 minute period. The mixture was then stirred for another 11 hours. The aqueous mixture was separated, washed with hexane twice, and then concentrated by heating at reduced pressure to give 1742.5 grams of a 20 percent vinylbenzyl dimethylsulfonium chloride (VBDMS+Cl−) solution. The product represents an 81 percent yield.

To a reaction vessel was charged 29.9 grams of hydroxyethyl methacrylate (HEMA), 24 grams of VBDMS+Cl− in 96 grams of water, 6.0 grams of p-nonylphenoxynonaethoxy ethyl methacrylate (9N-10MA) in 18 grams of water, 180 grams of t-butanol and 112 grams of water. This mixture was stirred under nitrogen at a temperature of 50° C., while 0.2 gram of t-butyl hydroperoxide in 36 grams water and 0.15 gram of sodium formaldehyde hydrosulfite (solid under the tradename FORMOPON®) in 36 grams water was added in separate streams at a rate of 1.5 ml every 5 minutes for a period of 2 hours. The polymerization was continued for 1 hour. The t-butanol was then removed by evaporation at reduced pressure.

EXAMPLES 74–78

In a manner otherwise generally similar to Example 73, HEMA, VBDMS+Cl−, 9N-10MA and optionally methacrylate acid (MAA) were polymerized for 2 to 4 hours at 50° C. The ratio of reactants and appearance of the product solution after removal of t-butanol is tabulated in Table XI.

TABLE XI.

| Example | Percent Reactants | | | | Product Appearance |
|---|---|---|---|---|---|
| | HEMA | VBDMS+CL− | 9N—10MA | MAA | |
| 74 | 80 | 10 | 10 | — | Clear* |
| 75 | 60 | 30 | 10 | — | Translucent, Ivory |
| 76 | 50 | 40 | 10 | — | Clear |
| 77 | 55 | 25 | 10 | 10 | Opaque, Ivory |
| 78 | 65.6 | 17.4 | 10 | 7 | Opaque, White |

*After adding small amount of t-butanol.

EXAMPLES 79–88

A vinyl addition polymer was prepared by reacting HEMA, 9N-10MA and MAA in a weight ratio of 80:10:10 in the presence of a hydroperoxide initiator. The carboxylic acid moieties on the polymer were reacted with aqueous ammonium hydroxide. The polymer was then converted back to the acid form and separated to enhance its purity. The polymer was diluted to 2 percent in water and neutralized with ammonium hydroxide to a pH of 10.8. A perfluorinated anionic surfactant sold by Minnesota Mining and Manufacturing Co. as FLUORAD® FC-128 was introduced in a concentration of 0.2 percent based on the polymer present.

A microporous polysulfone sheet (sold commercially as Millipore Pellicon PTHK membrane) was washed with deionized water and dried.

The microporous polysulfone sheet was then immersed in the above-described polymer solution for 1 hour under reduced pressure. The coated polysulfone was then lifted from the solution by one edge and allowed to drain for 1 minute. The polysulfone sheet was then dried at 110° C. for 10 minutes.

The polymers prepared in Examples 74–76 and others made in an analogous manner were reacted with an anion exchange resin to replace the chloride anions present which hydroxide anions. The resulting polymers were prepared as 2 percent aqueous solutions with a pH in the range from 10.8 to 12.85. To each solution was added 0.2 or 0.3 percent of FLUORAD® FC-134 cationic surfactant (based on the solids present). Each of these solutions was used to coat one side of the aforementioned coated polysulfone. The sheets were then cured at 110° C. for 20 or 25 minutes. The resulting membrane was soaked overnight in deionized water. A 1.2-square inch membrane section was cut out for testing in each instance. Frequently, multiple membranes of the same composition were prepared.

The percent salt rejection and water flux were measured for each membrane using a aqueous test solution containing 2500 ppm NaCl at 25° C. and a pH of 7 at an operating pressure of 400 or 600 psi with a recovery of less than 1 percent. The composition of the top coat (before conversion to hydroxide form), the pH of the top coat solution, the operating pressure, water flux and salt rejection are tabulated in Table II.

TABLE XII

| Example | Top Coat HEMA/VBDMS+Cl−/ 9N—10MA/MAA | pH | Pressure (psi) | Flux (GFD) | Salt Rejection (%) |
|---|---|---|---|---|---|
| 79 | 80/10/10/0 | 10.8 | 600 | 4.38 | 74.4 |
| 80 | " | " | " | 4.90 | 62.9 |
| 81 | 60/30/10/0 | 12.3 | 400 | 1.25 | 85.2 |
| " | " | " | 600 | 1.84 | 90.6 |
| 82 | " | " | 400 | 0.32 | 95.0 |
| " | " | " | 600 | 0.48 | 97.7 |
| 83 | 50/40/10/0 | " | 400 | 0.71 | 86.0 |
| " | " | " | 600 | 1.05 | 92.1 |
| 84 | " | " | 400 | 0.26 | 95.5 |
| " | " | " | 600 | 0.41 | 97.9 |
| 85 | 20/80/0/0 | 12.85 | 400 | 0.22 | 92.3 |
| 86 | " | " | " | 0.16 | 97.9 |
| 87 | 30/70/0/0 | 12.58 | " | 0.05 | 91.0 |
| 88 | " | " | " | 0.04 | 96.8 |

EXAMPLES 89–95

Twice-coated polysulfone membranes were prepared in the manner of Examples 79, 81, 83 and 87, except that the HEMA/9N-10MA/MAA prime coat was employed at a concentration of 1.5 percent and was dried for 8 minutes at 110° C. The composition of the top coat and the flux and salt rejection at 400 psi are tabulated in Table XIII.

TABLE XIII

| Example | Top Coat HEMA/VBDMS+Cl−/ 9N—10MA/MAA | Flux (GFD) | Salt Rejection (%) |
|---|---|---|---|
| 89 | 30/70/0/0 | 0.10 | 93.2 |
| 90 | 80/10/10/0 | 4.54 | 55.7 |
| 91 | " | 4.04 | 59.8 |
| 92 | 60/30/10/0 | 1.72 | 86.5 |
| 93 | " | 1.24 | 89.8 |
| 94 | 50/40/10/0 | 0.77 | 94.2 |

TABLE XIII-continued

| Example | Top Coat HEMA/VBDMS+Cl−/ 9N—10MA/MAA | Flux (GFD) | Salt Rejection (%) |
|---|---|---|---|
| 95 | " | 0.71 | 94.5 |

Examples 89–95 demonstrate that increasing the percent HEMA in the top coat generally increases the flux, while increasing the percentage VBDMS+Cl− in the top coat increases the rejection.

EXAMPLES 96–99

Twice-coated polysulfone membranes were prepared in the manner of Example 89, except that the prime coat was employed at a concentration of 0.75 or 0.3 percent. The prime coat concentration as well as the flux and salt rejection at 400 psi are tabulated in Table XIV.

TABLE XIV

| Example | Prime Coat % Polymer | Flux (GFD) | Salt Rejection (%) |
|---|---|---|---|
| 89 | 1.5 | 0.10 | 93.2 |
| 96 | 0.75 | 0.05 | 91.8 |
| 97 | " | 0.06 | 79.8 |
| 98 | 0.3 | 0.14 | 36.8 |
| 99 | " | 2.52 | 61.9 |

Examples 89 and 96–99 demonstrate that the concentration of the prime coat can affect the uniformity of the coating laid down on the substrate.

EXAMPLES 100–102

A microporous cellulose ester sheet available commercially under the tradename Millipore VS-type filter was employed as the substrate. The HEMA/9N-10MA/MAA terpolymer prepared in Example 79 was converted to its ammonium form and diluted to a concentration of 0.3, 0.75 or 1.5 percent. To each solution was added 0.3 percent (based on solids present) of FLUORAD ® FC-128 surfactant. The substrate was immersed in these solutions for one hour under reduced pressure, drained for one minute and then dried at 110° C. for 10 minutes.

The coated substrates were then top-coated on one side in the same manner and with the same solution as in Example 83 and cured at 110° C. for 20 minutes. The prime coat concentration and the flux and salt rejection of the membranes at three pressures using a 2500 ppm NaCl aqueous solution at less than 1 percent recovery are set out in Table XV.

TABLE XV

| Example | Prime Coat % Polymer | Pressure (psi) | Flux (GFD) | Salt Rejection (%) |
|---|---|---|---|---|
| 100 | 0.3 | 400 | 0.16 | 99.29 |
| " | " | 600 | 0.27 | 99.57 |
| " | " | 800 | 0.33 | 99.69 |
| 101 | 0.75 | 400 | 0.22 | 98.78 |
| " | " | 600 | 0.34 | 99.05 |
| " | " | 800 | 0.45 | 99.32 |
| 102 | 1.5 | 400 | 0.28 | 95.17 |
| " | " | 600 | 0.47 | 96.07 |
| " | " | 800 | 0.54 | 97.21 |

EXAMPLES 103–106

The membranes employed in Examples 81–84 were employed in chlorine stability tests. These membranes were employed with a 2500 ppm NaCl aqueous feed at 400 psi and 25° C. and less than 1 percent recovery. For the first 775 hours of the test the feed water was at a pH of 4.5 and contained 10 ppm $Cl_2$. The membranes were then operated for 72 hours with distilled water. The 10 ppm $Cl_2$ feed was resumed for 96 hours at pH 4.5 followed by 156 hours at pH 8.0. The flux in GFD and percent salt rejection for each membrane are tabulated in Table XVI.

TABLE XVI

| Operating Conditions | Example 103[a] Flux (GFD) | Rejection (%) | Example 104[b] Flux (GFD) | Rejection (%) | Example 105[c] Flux (GFD) | Rejection (%) | Example 106[d] Flux (GFD) | Rejection (%) |
|---|---|---|---|---|---|---|---|---|
| 10 ppm $Cl_2$ at pH 4.5 | | | | | | | | |
| After 7 hours | 1.33 | 90.2 | 0.37 | 96.4 | 0.77 | 91.5 | 0.29 | 96.6 |
| After 100 hours | 1.40 | 93.8 | 0.37 | 96.4 | 0.81 | 93.9 | 0.30 | 96.7 |
| After 300 hours | 1.42 | 93.5 | 0.38 | 96.1 | 0.78 | 93.1 | 0.31 | 95.0 |
| After 500 hours | 1.42 | 93.1 | 0.40 | 96.4 | 0.85 | 92.3 | 0.33 | 95.1 |
| After 775 hours | 1.24 | 91.5 | 0.36 | 95.2 | 0.74 | 87.8 | 0.30 | 92.9 |
| Water Feed | 1.56 | — | 0.44 | — | 0.89 | — | 0.34 | — |
| 10 ppm $Cl_2$ at pH 4.5 | | | | | | | | |
| After 18 hours | 1.20 | 87.8 | 0.36 | 93.3 | 0.68 | 85.4 | 0.29 | 92.4 |
| After 96 hours | 1.33 | 92.1 | 0.39 | 94.1 | 0.77 | 90.1 | 0.31 | 93.9 |
| 10 ppm $Cl_2$ at pH 8.0 | | | | | | | | |
| After 37 hours | 1.56 | 69.8 | 0.44 | 85.9 | 0.90 | 69.4 | 0.36 | 88.9 |
| After 156 hours | 1.66 | 70.2 | 0.44 | 89.7 | 0.67 | 68.9 | 0.36 | 88.3 |

[a]Membrane used in Example 81.
[b]Membrane used in Example 82.
[c]Membrane used in Example 83.
[d]Membrane used in Example 84.

Examples 103–106 demonstrate that these performance membranes exhibit superior chlorine tolerance.

EXAMPLE 107

In a manner generally similar to Example 73, HEMA, VBDMS+Cl−, 9N-10MA and MAA were polymerized in a ratio of 49.5:30.5:8.0:12.0. The polymer was then passed through a column of DOWEX ® SBR ion exchange resin is hydroxide form to convert the polymer to a zwitterion. A 2 percent solution of the resulting polymer in water along with 0.2 percent on a solids basis FLUORAD ® FC-134 surfactant was coated on a Millipore VS-type cellulose ester filter and cured at 100° C. for 30 minutes. The resulting membrane had a salt rejection of 97% and a flux of 0.6 GFD using a 2500 ppm NaCl feed at 400 psi.

EXAMPLE 108

In a manner generally similar to Example 76, a polymer of HEMA, VBDMS+Cl− and 9N-10MA in a weight ratio of 50:40:10 was prepared. The polymer was then dialyzed to remove polymer present having a molecular weight less than about 12,000. The polymer was then converted to hydroxide form using an ion exchange resin. The high molecular weight polymer fraction was diluted to 1 percent in water, along with 0.3 percent FLUORAD ® FC-134 surfactant on a solid basis.

The aqueous polymer solution was coated using a coating roll on a flat, wettable, microporous polysulfone sheet manufactured by FilmTec Corp. The coated sheet was air-dried at 110° C. in an oven for about 25 minutes. Three samples of the resulting composite membrane had a salt rejection in the range from 96.4 to 98.4 percent and a flux in the range from 2.5 to 3.8 GFD using a 2500 ppm NaCl feed at 400 psi.

EXAMPLE 109

In a manner generally similar to Example 73, a polymer of HEMA, VBDMS+Cl−, 9N-10MA and MAA in a weight ratio of 40:50:5:5 was prepared. The resulting polymer was dialyzed to remove polymer present having a molecular weight less than about 12,000. The polymer was converted to the hydroxide form using an ion exchange resin. The polymer fraction remaining was diluted to 1 percent in water, along with 0.3 percent FLUORAD ® FC-134 surfactant on a solid basis.

The aqueous polymer solution was coated using a coating roll on a flat, weetable, microporous polysulfone sheet. The coated sheet was air-dried at 110° C. for about 25 minutes. Three samples of the resulting composite membrane exhibited salt rejections in the range from 96.3 to 97.7 percent and fluxes in the range from 2.7 to 3.6 GFD using a 2500 ppm NaCl feed at 400 psi.

EXAMPLES 110–114

In a manner generally similar to Example 76, a polymer of HEMA, VBDMS+Cl− and 9N-10MA in a weight ratio of 50:40:10 was prepared. A microporous cellulosic filter (Example 110) was coated on one side with a 1 percent aqueous solution of polyacrylic acid (PAA) in the ammonium salt form. A second filter (Example 111) was coated on one side with a 2 percent aqueous solution of branched polyethyleneimine (PEI). Both coated filters were coated on the other side with the aqueous HEMA/VBDMS+OH−/9N-10MA and surfactant formulation of Example 108 and cured at 110° C. for 25 minutes.

A third and fourth microporous cellulosic filter (Examples 112 and Comparison Experiment No. 30) was coated with a 9:1 equivalent weight ratio of branched polyethyleneimine and the zwitterion corresponding to Formula II in Example 1 in a 1 percent aqueous solution containing 0.3 percent on a solids basis FC-134 surfactant. The filters were then cured at 110° C. for 25 minutes. One coated filter (Example 112) was coated with a solution of HEMA/VBDMS+OH−/9N-10MA like that in Example 76 except at a 2 percent concentration and then cured at 110° C. for 25 minutes.

A microporous polysulfone filter (Example 113) was coated with a 1 percent aqueous solution of HEMA/VBDMS+Cl−/9N-10MA polymer as in Example 76 and ammonium citrate in a 1:1 equivalent weight ratio. The coating solution included 0.3 percent FC-128 surfactant on a solids basis. The coated filter was then cured at 110° C. for 25 minutes.

A microporous polysulfone filter (Example 114) was coated with a 1 percent aqueous solution of HEMA/VBDMS+Cl−/9N-10MA polymer as in Example 76 and branched polyethyleneimine in a 1:2 equivalent weight ratio. The coating solution included 0.3 percent FC-134 surfactant on a solids basis. The coated filter was cured at 110° C. for 25 minutes.

The rejection and flux of the aforementioned coated membranes using a 0.25 percent NaCl solution at 400 psi is tabulated in Table XVII.

TABLE XVII

| Example | Comparative Experiment | Flux (GFD) | Rejection (%) |
|---|---|---|---|
| 110 | — | 0.1 | 96.5 |
| 111 | — | 0.32 | 99.5 |
| 112 | — | 0.20 | 99.43 |
| — | 30 | 1.64 | 80.13 |
| 113 | — | 0.58 | 90.35 |
| 114 | — | 3.0 | 83.0 |

EXAMPLE 115

A coated filter was prepared in the same manner as Example 112, but the coated filter was rinsed with distilled water prior to being cured. The cured coated filter exhibited a flux of 1.47 GFD and a rejection of 96.61 percent.

EXAMPLES 116–119

Four commercial brackish water reverse osmosis modules of the asymmetric cellulose triacetate hollow fiber type were tested to determine productivity and salt rejection. Each module was flushed with deionized water for one hour and then tested using a 1500 ppm NaCl feed at 250 psi and 25° C. with 75 percent recovery. Following testing, each module was flushed with deionized water.

The pH of the feed solution was adjusted to 7.0–7.5 and a vinyl acetate crotonic acid copolymer (sold by Air Products Company as VINAC © polymer) was added to 4 ppm concentration along with zero to 300 ppm NaCl. The VINAC ® solution was fed to each module at 250 psi and 25° C. After 0.5 hour, the module was again flushed with deionized water followed by adjustment of the pH to 4.5 with dilute hydrochloric acid.

The pH 4.5 water was recirculated through each module for 0.75 hour and the pH readjusted to 7.0–7.5 with dilute caustic. A terpolymer of HEMA/VBDMS+Cl−/9N-10MA as in Example 75 was added to the feed water to achieve a 22 ppm concentration. The terpolymer solution was then fed to each module at 250 psi and 25° C. After 0.5 hour each module was again flushed with water. Two of the modules were treated with 1.5 percent aqueous sodium bisulfite and stored.

The remaining two modules (Examples 118 and 119) were treated once more with 3 ppm VINAC ® solution at pH 7.0–7.5 for 0.5 hour at 250 psi at 25° C. Each module was then washed with water and preserved with 1.5 percent aqueous sodium bisulfite.

All four modules were then tested at 250 psi using 1500 ppm NaCl at 25° C. with 75 percent recovery. The results are tabulated in Table XVIII.

TABLE XVIII

| Example | Productivity (Gallon per day) | | Salt Rejection (%) | |
|---|---|---|---|---|
| | Initial | Post Treatment | Initial | Post Treatment |
| 116 | 25,983 | 23,885 | 87.3 | 97.8 |

TABLE XVIII-continued

| | Productivity (Gallon per day) | | Salt Rejection (%) | |
|---|---|---|---|---|
| Example | Initial | Post Treatment | Initial | Post Treatment |
| 117 | 19,678 | 17,741 | 87.3 | 97.9 |
| 118 | 19,587 | 17,089 | 94.3 | 97.0 |
| 119 | 20,087 | 17,488 | 93.8 | 98.4 |

It was observed that the modules bearing the VINAC® top coat were more resistant to fouling and more tolerant of cleaning.

EXAMPLE 120

A microporous cellulosic filter was soaked for 2 hours in a 0.56 percent solution of HEMA/9N -10 MA/methacrylic acid terpolymer in a 80/10/10 weight ratio and 0.3 percent FC-128 surfactant on a solids basis. The coating solution had a pH of 9.1 and salts present were in the ammonium form. The filter was then drained and dried on a glass plate at 100° C. for 6 minutes. The coated filter was then cooled to about 20° C. and recoated. Excess solution was removed by rolling a No. 8 wire coating rod over the surface. The twice coated filter was then dried once more at 100° C. for six minutes.

A second coating solution containing 2 percent VBDMS+OH− homopolymer and 0.3 percent on a solids basis of FC-134 surfactant was prepared. The coating solution was applied to coated filter and excess removed with a coating wire. The filter was then dried at 100° C. for 10 minutes. The coating and drying steps were repeated twice more with the last drying step being extended to 20 minutes.

The resulting membrane was soaked in 3.5 percent aqueous NaCl overnight. A sample of the membrane was then cleaned in deionized water and dried in air at room temperature. Gas permeation rates (cm$^3$(STP)/-(cm$^2$/sec/cm-Hg) for oxygen, nitrogen, carbon dioxide and methane were determined and are tabulated in Table XIX.

TABLE XIX

| Gas | Permeation Rate × 10$^{10}$ |
|---|---|
| O$_2$ | 2,619 |
| N$_2$ | 434 |
| CO$_2$ | 12,720 |
| CH$_4$ | 510 |

EXAMPLE 121

Comparative Experiment 31

In a reaction vessel under a nitrogen atmosphere 200 g of a styrene/maleic anhydride copolymer (in a ratio of 82:18 by weight for the monomers) were dissolved in 600 grams of sulfolane at 150° C. The sulfolane was agitated vigorously for 3 hours and then slowly for 2 hours. The solution was then cooled to 120° C.

A nonwoven polyester fabric sheet was fastened to a metal plate heated to 80° C. The sulfolane solution was coated on the polyester using a casting bar having a 15 mil gap. The coated fabric was quenched in a 4° C. water bath for 20 minutes and transferred to 10 percent ammonium hydroxide at 20° C. for 16 hours.

A small piece of the coated fabric was tested at standard reverse osmosis conditions for both flux and rejection in a comparative experiment. The membrane was then treated with 25 ppm VBDMS+OH− homopolymer at 400 psi. The feed flow rate was adjusted to consume 0.5 liter solution in a 3 hour period. The membrane was washed with water and flux and rejection measured. The reverse osmosis performance is tabulated in Table XX.

TABLE XX

| Example | Comparative Experiment | Flux (GFD) | Rejection (%) |
|---|---|---|---|
| 121* | — | 1.9 | 88.3 |
| — | 31** | 2.5 | 79.7 |

*After 72 hours.
**After 44 hours.

EXAMPLES 122–123

Comparative Experiments 32–33

Reverse osmosis membranes and controls were prepared in the general manner of Example 31. The cationic reactant corresponds to structure 12 in Table VI. The flux and rejection are tabulated in Table VII for these membranes.

EXAMPLE 124

A millipore VS filter with a nominal pore size of 0.025 microns was coated with a 2 percent solids aqueous solution. The solids in the solution consisted of 80 weight percent polyacrylamide (of which 5.5 percent was hydrolyzed) and 20 weight percent of p-bisphenol-A sufonium zwitterion. In addition, the solution contained 0.25 percent FC134 surfactant on a solids basis. The coating was cured at 87° C. for 1 hour.

The coated filter was used to filter a 5 percent glucose solution at 10 psi. The flux was 0.3 milliliter per minute (ml/min) and the rejection was 40 percent. A solution containing 5 percent sucrose was filtered at 10 psi, with a flux of 0.1 ml/min and rejection of 100 percent. Accordingly, the membrane has a molecular weight cut-off of about 300.

EXAMPLE 125

Millipore ultrafiltration filters of type VSWP having a nominal pore diameter of 0.025 microns were coated with an aqueous solution containing 2 weight-percent solids. The solids consist of 29.3 percent by weight bisphenol-A sulfonium zwitterion and 68.5 percent of a t-butyl monophenol sulfonium zwitterion corresponding to the formula

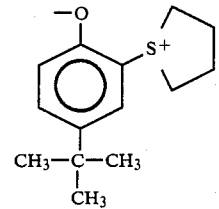

Additionally 0.2 percent on a solids basis of FC134 surfactant is present and 2 percent on a solids basis NATROSOL ® 250HR thickener from Hercules. The coating was dried between applications of coats at 85° C. for 5 minutes. Four coats were applied in all. The final coat was cured at 85° C. for 60 minutes.

The gas permeability of four membrane samples was measured for oxygen, nitrogen, carbon dioxide and methane at pressure differentials of either 15 or 2 psi at a temperature of 23° C. The permeabilities are tabulated in Table XXI.

TABLE XXI

| Sample No. | Gas Permeability (cm$^3$(STP) × 10$^8$/cm$^2$ sec/cmHg) | | | | ΔP (psi) |
|---|---|---|---|---|---|
| | O$_2$ | N$_2$ | CO$_2$ | CH$_4$ | |
| 1 | 18.4 | 4.5 | 57.4 | 4.5 | 15 |
| 2 | 17.5 | 2.2 | 64.1 | 2.1 | 15 |
| 3 | 9.0 | 1.4 | 50.2 | 2.0 | 2 |
| 4 | 6.3 | 1.3 | 39.0 | 1.9 | 2 |

EXAMPLE 126

A crosslinked membrane is prepared by casting a film from a solution of 1.36 grams of sodium carboxymethylcellulose, (carboxymethyl degree of substitution=0.9); 0.34 grams of sodium polyacrylate (5000 molecular weight); 0.09 grams of a bisphenol-A sulfonium zwitterion; 2 grams of a 1 weight percent surfactant solution and 38.2 grams of water. The film is cast onto a fluorinated hydrocarbon polymer surface using a 0.025 inch casting knife. The film is dried overnight and then heated to 110° C. for 1.5 hours to induce crosslinking. The resulting membrane is water-insoluble. The membrane is evaluated using an initial feed mixture of ethanol/water containing about 51 weight percent water until the water content of the feed is reduced to 39.37 percent. The water contents of the feeds and permeates, separation factors and the permeation rates for this example are as recorded in Table XXII.

TABLE XXII

| % H$_2$O in Feed | % H$_2$O in Permeate | Separation Factor | Permeation Rate (g-mil/m$^2$-hr) |
|---|---|---|---|
| 50.80 | 96.02 | 23.4 | 941.9 |
| 48.07 | 96.93 | 34.1 | 801.1 |
| 39.37 | 98.15 | 81.7 | 556.3 |

The feed is then replaced with a 10.5 percent water, 89.5 percent ethanol solution and the membrane is again evaluated. After the feed composition reaches 10.33 percent water, 2 grams of 50 percent solution of cesium hydroxide is added to the feed and the membrane is allowed to equilibrate overnight. The membrane is then further evaluated with results as shown in Table XXIII.

TABLE XXIII

| Sample No. | Counterion | % H$_2$O in Feed | % H$_2$O in Permeate | Separation Factor | Permeation Rate g-mil/m$^2$-hr |
|---|---|---|---|---|---|
| 6A | Na$^+$ | 10.43 | 99.74 | 3294 | 26.6 |
| 6B | Na$^+$ | 10.33 | 99.74 | 3330 | 26.1 |
| 6C | Cs$^+$ | 9.76 | 99.65 | 3632 | 83.5 |
| 6D | Cs$^+$ | 9.03 | 99.61 | 2573 | 70.8 |

The crosslinked membranes of this invention exhibit excellent selectivity, as shown by the permeate composition, even at very high feed water content and very high permeation rates. Moreover, the membrane exhibits no signs of failure despite the high water content in the feed. Upon reducing the water of the feed to about 10 percent, the permeation rate decreases dramatically and the permeate composition increases to over 99 percent water. It is noted that the addition of the cesium to the feed results in a tripling of the permeation rate with only a minimal decrease in the water content of the permeate. Even when using cesium as the counterion, the permeate consistently contains at least 99.6 percent water.

EXAMPLE 127

Cellulose tricetate (CTA) hollow fiber membranes were sequentially treated at 200 psi and 20° C. with (1) an aqueous solution of 25 ppm of a copolymer of 95 weight percent vinyl acetate and 5 weight percent crotonic acid at a pH of 7.5 at a flow rate of 120 ml/min for 3 hours followed by (2) an aqueous solution of 25 ppm of a terpolymer of HEMA/VBDMS+Cl/9N10MA (as in Example 92) in a ratio of 60:30:10 by weight at a flow rate of 2.5 grams per minute for three hours. In between the two aqueous solutions, the fibers were flushed with water.

After coating the external surface of the fibers, a 50:50 volume mix of isopropanol and isooctane was passed through the fiber bores at 15 psig while air was passed over the external fiber surface to dry the fibers in the manner of U.S. Pat. No. 4,430,807, which is incorporated herein by reference. After several hours, nitrogen was introduced into the fiber bores while first air was passed over the external surface and then a vacuum applied to complete drying.

The dry CTA membranes were prepared in the aforementioned manner and tested to determine permeability to carbon dioxide and methane. The coated membrane exhibited 30 percent lower flux for carbon dioxide but a 19 percent higher separation factor than otherwise similar uncoated membranes.

What is claimed is:

1. Method of forming a semi-permeable membrane comprising:
    (a) contacting a permeable substrate bearing through physical contact or chemical bonding a plurality of reactive ionic groups of a first charge with a compound bearing reactive ionic groups of a charge opposite the first charge to form a coacervate layer, and
    (b) subjecting the coated substrate to reaction conditions effective to convert a plurality of the ionic bonds in the coacervate layer to covalent bonds thereby rendering the layer derived from the coacervate essentially water insoluble.

2. The method as described in claim 1 wherein the substrate is a microporous polysulfone, a microporous cellulose ester or mixed cellulose ester with an adherent layer comprising a compound bearing ionic groups of a first charge.

3. The method as described in claim 2 wherein the ionic groups of the first charge are selected from the group consisting of sulfonium, quaternary ammonium, phosphonium, pyridinium, thiazolinium, imidazolinium and diazonium.

4. The method as described in claim 2 wherein the ionic groups of the charge opposite the first charge are selected from the group consisting of thioarylates, thioalkylates, arylates, alkylates and carboxylates.

5. The method as described in claim 4 wherein the ionic groups of the first charge are sulfonium groups.

6. The method as described in claim 5 wherein the adherent layer is a vinyl addition polymer containing at least 10 percent by weight of the reaction product of an ethylenically unsaturated monomer bearing at least one sulfonium group.

7. The method as described in claim 6 wherein the sulfonium-containing monomer corresponds to the formula

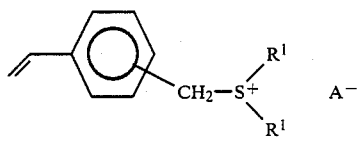

wherein $R^1$ at each occurrence is independently a monovalent hydrocarbon radical, a monovalent inertlysubstituted hydrocarbon radical or both $R^1$ groups together with $-S^+<$ form a 5-, 6- or 7-member ring and A is a compatible anion.

8. The method as described in claim 7 wherein both $R^1$ groups together form a butylene.

9. The method as described in claim 7 wherein $R^1$ is methyl at each occurrence.

10. The method as described in claim 7 wherein $R^1$ is $-C_2H_4OH$ at each occurrence.

11. The method as described in claim 6 wherein the remainder of the vinyl addition polymer is derived from monomers selected from the group consisting of monomers corresponding to the formula

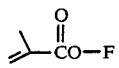

wherein F is a $C_1$ to $C_{20}$ alkyl, $C_1$ to $C_{20}$ hydroxyalkyl or corresponds to the formula

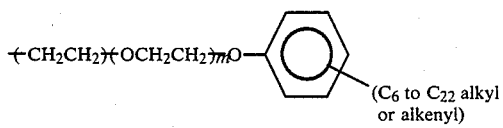

and m is an integer from 1 to 20.

12. The method as described in claim 11 wherein the remainder of the vinyl addition polymer is derived from monomers selected from the group consisting of acrylamide, methacrylamide, styrene sulfonic acid, butadiene, isoprene, alkyl cyanoacrylate, vinyl benzyl chloride and its derivatives, styrene sulfonamide, vinyl acetate, acrylamide, methacrylamide, vinyl pyrrolidone and 2-sulfoethyl methacrylate, acrylonitrile, ($C_1$ to $C_{20}$ alkyl) methacrylates, ($C_1$ to $C_{20}$ alkyl) acrylate, ($C_2$ to $C_{20}$ hydroxyalkyl) methacrylates, p-tert-butylstyrene, p-tert-butyl-(α-methyl)styrene, dicyclopentenyl acrylate, isobornyl acrylate, isobornyl methacrylate and dicyclopentenyl methacrylate.

13. The method as described in claim 6 wherein the compound bearing reactive ionic groups of a charge opposite the first charge is a vinyl addition polymer bearing a plurality of carboxylate groups.

14. The method as described in claim 13 wherein the compound of a charge opposite the first charge is derived from monomers corresponding to the formulae

wherein $G^+$ is $Na^+$, $K^+$, $NH_4^+$ or other compatible cation and F is a $C_1$ to $C_{20}$ alkyl, $C_2$ to $C_{20}$ hydroxyalkyl or corresponds to the formula

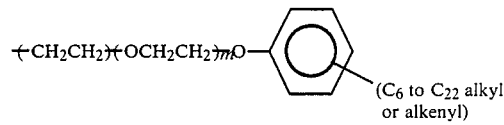

wherein m is an integer from 1 to 20.

15. The method as described in claim 11 wherein the permeable substrate bears through chemical bonding a plurality of reactive ionic groups of a first charge.

16. The method as described in claim 15 wherein the bonded ionic groups are sulfonium or quaternary ammonium groups.

17. The method as described in claim 15 wherein the bonded ionic groups are carboxylate groups.

18. The method as described in claim 2 wherein the ionic groups of the first charge are selected from the group consisting of thioarylates, thioalkylates, arylates, alkylates and carboxylates.

19. The method as described in claim 18 wherein the adherent layer is a vinyl addition polymer or carboxymethylcellulose.

20. The method as described in claim 19 wherein the adherent layer is a vinyl addition polymer which contains a plurality of carboxylate groups.

21. The method as described in claim 20 wherein the vinyl addition polymer is derived from monomers corresponding to the formulae

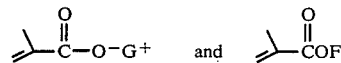

wherein $G^+$ is $Na^+$, $K^+$, $NH_4^+$ or other compatible cation and F is a $C_1$ to $C_{20}$ alkyl, $C_2$ to $C_{20}$ hydroxyalkyl or corresponds to the formula

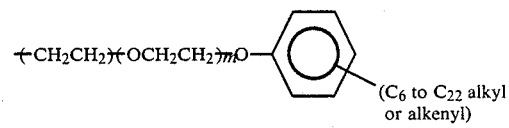

wherein m is an integer from 1 to 20.

22. The method as described in claim 18 wherein the compound bearing reactive ionic groups of a charge opposite the first charge bears a plurality of sulfonium groups.

23. The method as described in claim 22 wherein the compound bearing ionic groups of opposite charge to the first is a vinyl addition polymer containing at least 10 percent by weight of the reaction product of an ethylenically unsaturated monomer bearing at least one sulfonium group.

24. The method as described in claim 23 wherein the sulfonium-containing monomer corresponds to the formula

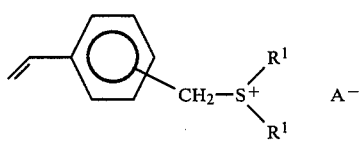

wherein $R^1$ at each occurrence is independently a monovalent hydrocarbon radical, a monovalent inertly-substituted hydrocarbon radical or both $R^1$ groups together with —S+ form a 5-, 6- or 7-member ring and A is a compatible anion.

25. The method as described in claim 24 wherein both $R^1$ groups together form a butylene.

26. The method as described in claim 24 wherein $R^1$ is methyl at each occurrence.

27. The method as described in claim 24 wherein $R^1$ is —$C_2H_4OH$ at each occurrence.

28. The method as described in claim 1 wherein covalent bonds are formed in the coacervate layer by heating the layer to a temperature less than 125° C. and simultaneous removal of water from the layer.

29. The method as described in claim 24 wherein the remainder of the vinyl addition polymer is derived from monomers selected from the group consisting of acrylonitrile, $C_1$ to $C_{20}$ alkyl methacrylates, $C_2$ to $C_{20}$ hydroxyalkyl methacrylates, p-tert-butyl styrene, p-tert-butyl-(α-methyl)styrene, dicyclopentenyl acrylate and dicyclopentenyl methacrylate.

30. The method as described in claim 1 wherein the permeable substrate is sequentially contacted with first the compound bearing the first reactive ionic groups in an aqueous diluent followed by the compound bearing groups of opposite charge in an aqueous diluent.

31. The method as described in claim 30 further comprising repeating the sequence of contacting the substrate with compounds of the first charge and the compound of the opposite charge, so that a plurality of coatings of alternating charges is applied to the substrate.

32. The method as described in claim 31 further comprising rinsing the coacervate layer with water and partially curing each coacervate layer before repeating the contacting steps.

33. The method of forming a semi-permeable membrane comprising:
(a) contacting a porous support layer with a diluent containing a first compound which bears at least one reactive cationic group and a diluent containing a second compound which bears at least one reactive nucleophilic group, with the proviso that either the first or second compounds bear an average of more than one reactive group or at least one of the first or second compounds is polymerizable; and
(b) reacting the first compound with the second compound so as to form on the support layer an adherent, essentially continuous, semi-permeable layer of a covalently bonded reaction product.

34. The method as described in claim 33 wherein the first compound bears a plurality of cationic groups and the first compound is first deposited on the support layer then the second compound contacts the support layer bearing an adherent layer of the first compound.

35. The method as described in claim 33 wherein the second compound bears a plurality of nucleophilic groups and the second compound is first deposited on the support layer then the first compound contacts the support layer bearing an adherent layer of the second compound.

36. The method as described in claim 33 wherein the first and second compounds are both a single compound bearing a plurality of sulfonium groups with a nucleophilic counterion.

37. The method as described in claim 36 wherein the nucleophilic counterion is hydroxide, bicarbonate or a $C_2$ to $C_{10}$ carboxylate.

38. The method as described in claim 37 wherein the nucleophile is the conjugate base of pivalic acid or citric acid.

39. The method as described in claim 36 wherein the sulfonium compound is an amphoteric polymer including a plurality of carboxylate groups.

40. The method as described in claim 35 wherein the second compound is polyethyleneimine and the first compound is a sulfonium compound.

41. The method as described in claim 33 wherein the support layer is microporous and has a first major surface and a second major surface and the first compound contacts the first surface while simultaneously the second compound contacts the second major surface.

42. The method as described in claim 33 wherein the diluents for both the first and second compounds are aqueous.

43. The method as described in claim 33 wherein the support layer is a semi-permeable reverse osmosis membrane.

44. The method as described in claim 35 wherein the first compound is an aryl cyclic sulfonium zwitterion and the second compound bears a plurality of nucleophilic groups.

* * * * *

UNITED STATES PATENT AND TRADEMARK OFFICE
CERTIFICATE OF CORRECTION

PATENT NO. : 4,839,203

Page 1 of 12

DATED : June 13, 1989

INVENTOR(S) : Thomas E. Davis, et al.

It is certified that error appears in the above-identified patent and that said Letters Patent is hereby corrected as shown below:

Column 11, line 40, in Table A, the formula should correctly appear as

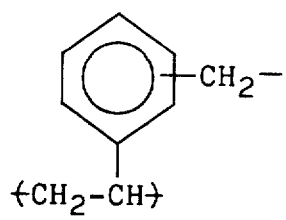

and be moved to appear across from the formula

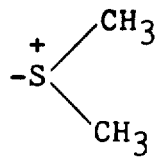

which appears under Q + of Table A.

UNITED STATES PATENT AND TRADEMARK OFFICE
CERTIFICATE OF CORRECTION

PATENT NO. : 4,839,203
DATED : June 13, 1989
INVENTOR(S) : Thomas E. Davis, et al.

It is certified that error appears in the above-identified patent and that said Letters Patent is hereby corrected as shown below:

Column 12, line 32, Table A - continued, the formula should correctly appear as

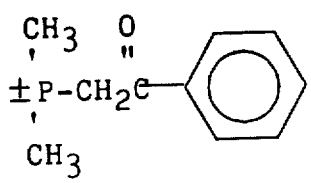

Column 12, line 49, the formula should correctly appear as

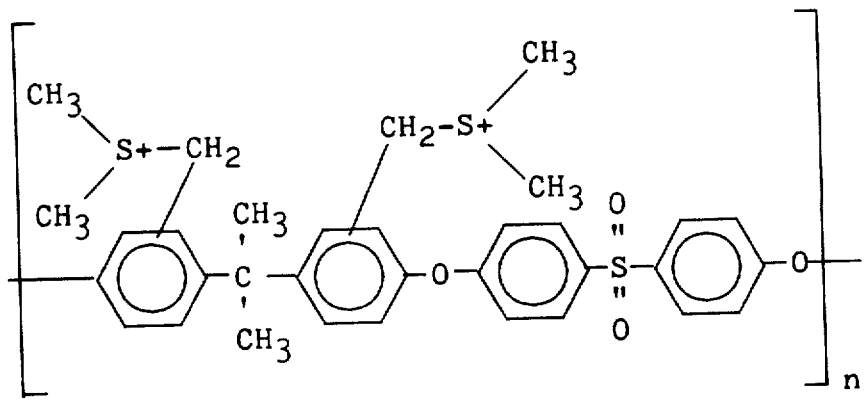

UNITED STATES PATENT AND TRADEMARK OFFICE
CERTIFICATE OF CORRECTION

PATENT NO.  : 4,839,203
DATED       : June 13, 1989
INVENTOR(S) : Thomas E. Davis, et al.

It is certified that error appears in the above-identified patent and that said Letters Patent is hereby corrected as shown below:

Column 14, line 10, "nucliophilic" should correctly appear --nucleophilic--;

Column 14, lines 42-43, "compund" should correctly appear --compound--;

Column 15, lines 45-53, in the formula should correctly appear

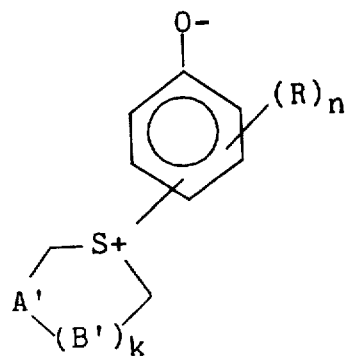

UNITED STATES PATENT AND TRADEMARK OFFICE
CERTIFICATE OF CORRECTION

PATENT NO. : 4,839,203

DATED : June 13, 1989

INVENTOR(S) : Thomas E. Davis, et al.

It is certified that error appears in the above-identified patent and that said Letters Patent is hereby corrected as shown below:

Column 17, line 45, "discrimination" should correctly appear --discriminating--;

Column 17, line 60, "non-communication" should correctly appear --non-communicating--;

Column 18, line 2, "supportiong" should correctly appear --supporting--;

Column 18, lines 2-3, "discriminationg" should correctly appear --discriminating--;

Column 19, line 66, "subtrate" should correctly appear --substrate--;

Column 20, line 22, "conveinient" should correctly appear --convenient--;

Column 20, line 32, "convalent" should correctly appear --covalent--;

UNITED STATES PATENT AND TRADEMARK OFFICE
CERTIFICATE OF CORRECTION

PATENT NO. : 4,839,203

DATED : June 13, 1989

INVENTOR(S) : Thomas E. Davis, et al.

It is certified that error appears in the above-identified patent and that said Letters Patent is hereby corrected as shown below:

Column 20, line 49, "fromt" should correctly appear --from--;

Column 20, line 57, "fromulations" should correctly appear --formulations--;

Column 21, line 2, "addusts" should correctly appear --adducts--;

Column 21, line 2, between the words "form" and "the" please insert --,--;

Column 21, line 46, between the words "polymer." and "In" insert a paragraph;

Column 21, line 52, "arylic" should correctly appear --acrylic--;

Column 21, line 68, "moienties" should correctly appear --moieties--;

UNITED STATES PATENT AND TRADEMARK OFFICE
CERTIFICATE OF CORRECTION

PATENT NO. : 4,839,203

DATED : June 13, 1989

INVENTOR(S) : Thomas E. Davis  et al.

It is certified that error appears in the above-identified patent and that said Letters Patent is hereby corrected as shown below:

Column 22, line 3, between the words "acid" and "Micro-" insert --. --;

Column 22, line 45, "divice" should correctly appear --device--;

Column 23, line 24, between the words "gradient" and "maintained" insert --is--;

Column 23, line 48, "copollymer" should correctly appear --copolymer--;

Column 24, line 1, "tion" should correctly appear --tions--;

Column 25, line 28, between the words "solution." and "As", please insert a paragraph;

Column 26, line 2, "membranes" should correctly appear --membrane--;

UNITED STATES PATENT AND TRADEMARK OFFICE
CERTIFICATE OF CORRECTION

PATENT NO. : 4,839,203
DATED : June 13, 1989
INVENTOR(S) : Thomas E. Davis, et al.

It is certified that error appears in the above-identified patent and that said Letters Patent is hereby corrected as shown below:

Column 26, line 28, the formula should correctly appear

Column 26, line 35, "anino" should correctly appear --anion--;

Column 26, line 51, "or the invention" should correctly appear --of the invention--;

Column 26, line 52, the formula should correctly appear

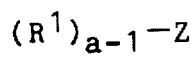

UNITED STATES PATENT AND TRADEMARK OFFICE
CERTIFICATE OF CORRECTION

PATENT NO. : 4,839,203

DATED : June 13, 1989

INVENTOR(S) : Thomas E. Davis, et al.

It is certified that error appears in the above-identified patent and that said Letters Patent is hereby corrected as shown below:

Column 26, line 58, "haves" should correctly appear --have--;

Column 26, line 58, after the word "membranes" insert --.--;

Column 26, line 65, "process" should correctly appear --processes--;

Column 27, line 8, "vinly" should correctly appear --vinyl--;

Column 27, line 11, "benzly" should correctly appear --benzyl--;

Column 27, line 24, "copolymer." should correctly appear --copolymer,--;

Column 27, line 39 "composition" should correctly appear --compositions--;

UNITED STATES PATENT AND TRADEMARK OFFICE
CERTIFICATE OF CORRECTION

PATENT NO. : 4,839,203

DATED : June 13, 1989

INVENTOR(S) : Thomas E. Davis, et al.

It is certified that error appears in the above-identified patent and that said Letters Patent is hereby corrected as shown below:

Column 28, line 30, "caryoxy-terminated" should correctly appear --carboxy-terminated--;

Column 29, line 6, "polyarylamide" should correctly appear --polyacrylamide--;

Column 29, line 8, "partricularly" should correctly appear --particularly--;

Column 29, line 8, "Coploymers" should correctly appear -- Copolymers--;

Column 29, line 21, "madatory" should correctly appear --mandatory--;

Column 29, line 51, "sojuble" should correctly appear --soluble--;

Column 30, lines 1-8, the formula should correctly appear

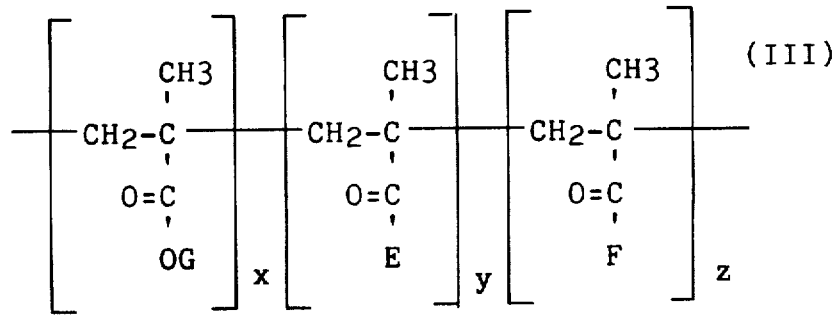

UNITED STATES PATENT AND TRADEMARK OFFICE
CERTIFICATE OF CORRECTION

PATENT NO. : 4,839,203
DATED : June 13, 1989
INVENTOR(S) : Thomas E. Davis, et al.

It is certified that error appears in the above-identified patent and that said Letters Patent is hereby corrected as shown below:

Column 30, line 10, "—$OCH_2CH_2SO_2$ OG" should correctly appear -- —$OCH_2CH_2SO_2OG$--;

Column 30, line 11, "—$OCH_2CH_2OH$; G" should correctly appear -- —$OCH_2CH_2OH$;-G--;

Column 30, line 64, "mehtyl" should correctly appear --methyl--;

Column 31, line 25, "phemol" should correctly appear --phenol--;

Column 31, line 67, "refection" should correctly appear --rejection--;

Column 32, line 27, "thet" should correctly appear --that--;

Column 32, lines 28-29, "propolymer" should correctly appear --prepolymer--;

Column 32, lines 61-62, delete the phrase "o-cresol zwitterion monomer and 36 percent weight";

Column 33, line 9, "switterion," should correctly appear --zwitterion--;

Column 32, line 61, after "weight" should correctly appear --of--;

UNITED STATES PATENT AND TRADEMARK OFFICE
CERTIFICATE OF CORRECTION

PATENT NO. : 4,839,203
DATED : June 13, 1989
INVENTOR(S) : Thomas E. Davis, et al.

It is certified that error appears in the above-identified patent and that said Letters Patent is hereby corrected as shown below:

Column 33, line 63, "form" should correctly appear --from--;

Column 34, line 9, "EXAMPLES 19-22" should be on a line by itself and centered;

Column 34, line 30, "EXAMPLE 23" should be centered;

Column 34, lines 67-68, "EXAMPLE 25" should be on a line by itself and centered;

Column 35, line 4, "Ch4" should correctly appear --$CH_4$--;

Column 35, line 6, "caculated." should correctly appear --calculated.--;

UNITED STATES PATENT AND TRADEMARK OFFICE
CERTIFICATE OF CORRECTION

PATENT NO. : 4,839,203
DATED : June 13, 1989
INVENTOR(S) : Thomas E. Davis, et al.

It is certified that error appears in the above-identified patent and that said Letters Patent is hereby corrected as shown below:

Column 43, line 45, "Thhe" should correctly appear --The--;

Column 47, line 24, "solid" should correctly appear --sold--;

Column 50, line 57, "is" should correctly appear --in--;

Column 51, line 29, "weetable," should correctly appear --wettable--;

Column 55, line 24, "water-insolible." should correctly appear --water-insoluble.--.

Signed and Sealed this

Twenty-fifth Day of February, 1992

Attest:

HARRY F. MANBECK, JR.

*Attesting Officer*     *Commissioner of Patents and Trademarks*